United States Patent
Srinivas et al.

(10) Patent No.: US 9,876,572 B2
(45) Date of Patent: Jan. 23, 2018

(54) CONFIGURING A COMPUTER NETWORK TO SATISFY MULTICAST DISPERSION AND LATENCY REQUIREMENTS USING AFFINITY AND NETWORK TOPOLOGIES

(71) Applicant: PLEXXI INC., Nashua, NH (US)

(72) Inventors: Anand Srinivas, San Francisco, CA (US); David J. Husak, Windham, NH (US); Denis H. deRuijter, Harvard, MA (US)

(73) Assignee: PLEXXI INC., Nashua, NH (US)

( * ) Notice: Subject to any disclaimer, the term of this patent is extended or adjusted under 35 U.S.C. 154(b) by 158 days.

(21) Appl. No.: 15/045,411

(22) Filed: Feb. 17, 2016

(65) Prior Publication Data
US 2016/0165326 A1 Jun. 9, 2016

Related U.S. Application Data

(63) Continuation of application No. 13/651,212, filed on Oct. 12, 2012, now Pat. No. 9,301,026, which is a
(Continued)

(51) Int. Cl.
*H04Q 11/00* (2006.01)
*H04B 10/27* (2013.01)
(Continued)

(52) U.S. Cl.
CPC ............ *H04B 10/27* (2013.01); *H04L 41/12* (2013.01); *H04L 45/20* (2013.01); *H04Q 3/0083* (2013.01);
(Continued)

(58) Field of Classification Search
CPC ............ H04Q 3/0083; H04Q 11/0066; H04Q 2011/0047; H04Q 2011/009; H04B 10/27; H04L 41/12; H04L 45/20; H04L 12/733
See application file for complete search history.

(56) References Cited

U.S. PATENT DOCUMENTS

| 5,008,881 A | 4/1991 | Karol |
| 6,570,685 B1 | 5/2003 | Fujita et al. |

(Continued)

FOREIGN PATENT DOCUMENTS

| EP | 2 429 122 | 3/2012 |
| WO | WO 2008/073636 | 6/2008 |

(Continued)

OTHER PUBLICATIONS

Hybrid Optical WDM Networks Utilizing Optical Waveband and Electrical Wavelength Cross-connects; Nagoya University; Hai-Chau Le, Hiroshi Hasegawa and Ken-ichi Sato; 2011.
(Continued)

*Primary Examiner* — Charles C Jiang
*Assistant Examiner* — Kyaw Z Soe
(74) *Attorney, Agent, or Firm* — Preti Flaherty Beliveau & Pachios LLP

(57) ABSTRACT

Systems and methods of affinity modeling in data center networks that allow bandwidth to be efficiently allocated within the data center networks, while reducing the physical interconnectivity requirements of the data center networks. Such systems and methods of affinity modeling in data center networks further allow computing resources within the data center networks to be controlled and provisioned based at least in part on the network topology and an application component topology, thereby enhancing overall application program performance. Using an affinity topology describing requirements for communications between applications and a network topology, network nodes are configured to satisfy multicast dispersion and latency requirements associated with communications between applications.

18 Claims, 25 Drawing Sheets

Related U.S. Application Data continuation-in-part of application No. 13/528,501, filed on Jun. 20, 2012, now Pat. No. 9,065,582, and a continuation-in-part of application No. 13/528,211, filed on Jun. 20, 2012, now Pat. No. 8,842,988.

(60) Provisional application No. 61/554,107, filed on Nov. 1, 2011.

(51) Int. Cl.
*H04Q 3/00* (2006.01)
*H04L 12/24* (2006.01)
*H04L 12/733* (2013.01)

(52) U.S. Cl.
CPC ... *H04Q 11/0066* (2013.01); *H04Q 2011/009* (2013.01); *H04Q 2011/0047* (2013.01)

(56) References Cited

U.S. PATENT DOCUMENTS

| | | | |
|---|---|---|---|
| 6,711,324 | B1 | 3/2004 | Zang et al. |
| 7,254,138 | B2 | 8/2007 | Sandstrom |
| 7,333,511 | B2 | 2/2008 | Sandstrom |
| 7,477,844 | B2 | 1/2009 | Gumaste et al. |
| 7,522,837 | B2 | 4/2009 | Tanobe et al. |
| 7,743,127 | B2 | 6/2010 | Santos et al. |
| 7,986,713 | B2 | 7/2011 | Sandstrom |
| 8,027,585 | B2 | 9/2011 | Yokoyama |
| 9,210,048 | B1 * | 12/2015 | Marr ............... H04L 41/145 |
| 9,686,125 | B2 * | 6/2017 | Smith ............... H04L 41/0654 |
| 2002/0131118 | A1 | 9/2002 | Chiaroni et al. |
| 2003/0046127 | A1 | 3/2003 | Crowe et al. |
| 2004/0105364 | A1 | 6/2004 | Chow et al. |
| 2004/0131064 | A1 | 7/2004 | Burwell et al. |
| 2005/0044195 | A1 | 2/2005 | Westfall |
| 2006/0123477 | A1 | 6/2006 | Raghavan et al. |
| 2006/0228112 | A1 | 10/2006 | Palacharla et al. |
| 2006/0275035 | A1 | 12/2006 | Way |
| 2008/0062891 | A1 | 3/2008 | Van der Merwe et al. |
| 2008/0144511 | A1 | 6/2008 | Marcondes et al. |
| 2009/0092064 | A1 | 4/2009 | Fan et al. |
| 2009/0138577 | A1 * | 5/2009 | Casado ............... H04L 41/06 709/220 |
| 2009/0219817 | A1 | 9/2009 | Carley |
| 2009/0268605 | A1 | 10/2009 | Campbell et al. |
| 2009/0296719 | A1 * | 12/2009 | Maier ............... H04L 45/12 370/400 |
| 2009/0328133 | A1 | 12/2009 | Strassner et al. |
| 2010/0014518 | A1 | 1/2010 | Duncan et al. |
| 2010/0115101 | A1 | 5/2010 | Lain et al. |
| 2010/0121972 | A1 | 5/2010 | Samuels et al. |
| 2010/0284691 | A1 | 11/2010 | Zottmann |
| 2011/0090892 | A1 | 4/2011 | Cooke |

FOREIGN PATENT DOCUMENTS

| | | |
|---|---|---|
| WO | WO 2008/116309 | 10/2008 |
| WO | WO 2009/042919 | 4/2009 |
| WO | WO 2009/096793 | 8/2009 |
| WO | WO 2009/151847 | 12/2009 |
| WO | WO 2010/133114 | 11/2010 |
| WO | WO 2010/138937 | 12/2010 |

OTHER PUBLICATIONS

Scalable Photonic Interconnection Network With Multiple-Layer Configuration for Warehouse-Scale Networks; NTT Network Innovation Laboratories; Toshikazu Sakano and Shuto Yamamoto; Optical Society of America; Jun. 22, 2011.

A Torus-Based 4-Way Fault-Tolerant Backbone Network Architecture for Avionic WDM LANs; The Department of Electrical and Computer Engineering, University of Florida; Dexiang Wang and Janise Y. McNair; Optical Society of America; Mar. 31, 2011.

P2i-Torus: A Hybrid Architecture for Direct Interconnection; Department of Computer Science and Technology, Tsinghua University; Chao Zhang and Menghan Li; IEEE; Dec. 24-26, 2011.

Making High Bandwidth But Low Revenue Per Bit Network Applications Profitable; Optimum Communications Services, Inc.; Jan. 15, 2010.

A Policy-aware Switching Layers for Data Centers; Electrical Engineering and Computer Sciences, University of California at Berkeley; Dilip Antony Joseph, Arsalan Tavakoli and Ion Stoica; Jun. 24, 2008.

Optimum Communications Services: Finally a way out of the zero-sum game?; TechnologyInside on the web; Oct. 20, 2008.

Impact of Adaptive Layer 1 for Packet Switching Network Cost and Qos; TRLabs Next Generation Internet Workshop; Mark Sandstrom; Optimum Communications; Nov. 9, 2007.

A Proposal of Hierarchical Chordal Ring Network Topology for WDM Networks; Tomoya Kitani, Nobuo Funabiki and Teruo Higashino; IEEE; 2004.

Flattened Butterfly: A Cost-Efficient Topology for High-Radix Networks; John Kim, William J. Daily, Computer Systems Laboratories; Dennis Abts, Cray Inc.; Jun. 9-13, 2007.

WDM-Based Local Lightwave Networks Part II: Multihop Systems; IEEE; Biswanath Mukherjee; Jul. 1992.

High Performance Datacenter Networks; Architectures, Algorithms, and Opportunities; Dennis Abts and John Kim; 2011; 115 Pages.

Sudevalayam, Sujesha et al., "Affinity-aware Modeling of CPU Usage for Provisioning Virtualized Applications," 2011 IEEE 4th International Conference on Cloud Computing, Jul. 4, 2011, pp. 139-146, XP031934583.

* cited by examiner

Network Topology Data Structure 802

Network Element 1
 - Type of Network Element (e.g. Switch, Router, Server, etc.)
 - List of "Network Links" outgoing from Network Element 1

Network Element 2
 - Type of Network Element (e.g. Switch, Router, Server, etc.)
 - List of "Network Links" outgoing from Network Element 2

●
●
●

Network Link
 - Endpoint Network Elements
 - Description of Endpoint Interfaces (MAC addresses, interface Speed, etc.)

*FIG. 8a*

Affinity Topology Data Structure 804

Affinity Group 1
- List of contained affinity groups/ports within affinity group 1
- List of "Affinity Links" outgoing from Affinity Group 1

Affinity Group 2
- List of contained affinity groups/ports within affinity group 2
- List of "Affinity Links" outgoing from Affinity Group 2

●
●
●

Affinity Link
- List of user defined affinity requirements
- List of computed affinity attributes

*FIG. 8b*

Affinity Network Topology Data Structure 806

Affinity Network Node 1
- Type of Affinity Network Node (e.g. either network node or affinity group)
- List of "Affinity Network Links" outgoing from Affinity Network Node 1 (either Affinity Link, Network Link or Association link)

Affinity Network Node 2
- Type of Affinity Network Node (e.g. either network node or affinity group)
- List of "Affinity Network Links" outgoing from Affinity Network Node 2 (either Affinity Link, Network Link or Association link)

●
●
●

Affinity Network Link
- Either Affinity Link, Network Link or Association Link (i.e. linking an affinity element to the network elements it tranverses)

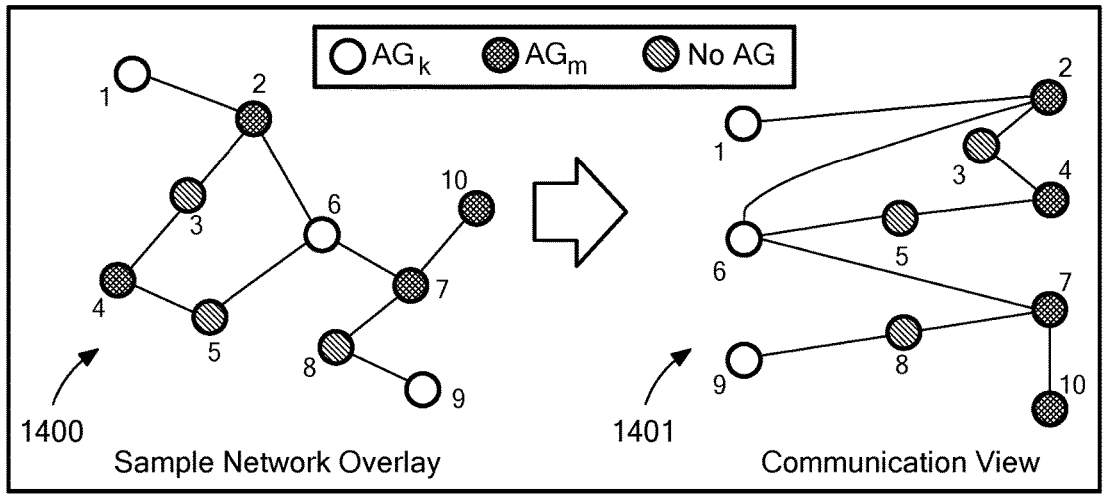
FIG. 14a
| | BW | # Hops |
|---|---|---|
| 6 → 2 | 2 | {1},{4} |
| 6 → 4 | 2 | {2},{3} |
| 6 → 7 | 1 | {1} |
| 6 -- 10 | 1 | {2} |
FIG. 14b
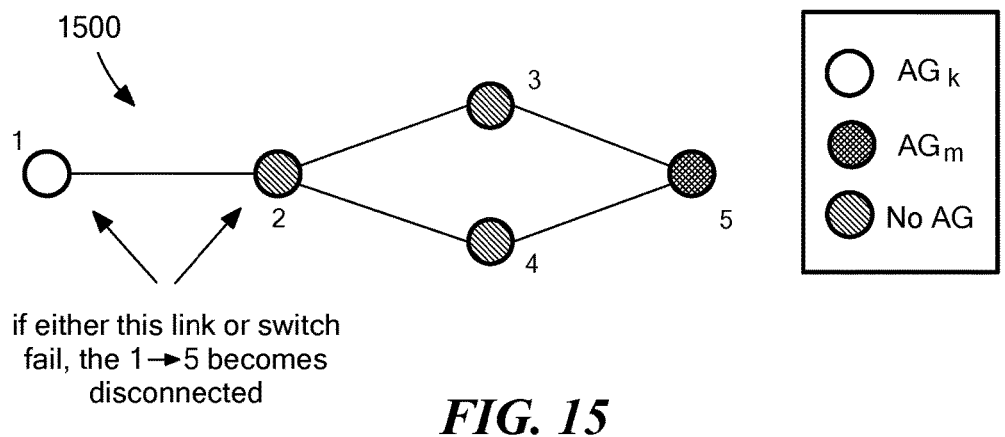
FIG. 15

CONFIGURING A COMPUTER NETWORK TO SATISFY MULTICAST DISPERSION AND LATENCY REQUIREMENTS USING AFFINITY AND NETWORK TOPOLOGIES

CROSS REFERENCE TO RELATED APPLICATIONS

This application is a continuation of U.S. patent application Ser. No. 13/651,212 filed Oct. 12, 2012 entitled AFFINITY MODELING IN A DATA CENTER NETWORK, which is a continuation-in-part of U.S. patent application Ser. No. 13/528,501 issued on Jun. 23, 2015 as U.S. Pat. No. 9,065,582 entitled OPTICAL ARCHITECTURE AND CHANNEL PLAN EMPLOYING MULTI-FIBER CONFIGURATIONS FOR DATA CENTER NETWORK SWITCHING, and a continuation-in-part of U.S. patent application Ser. No. 13/528,211 issued on Sep. 23, 2014 as U.S. Pat. No. 8,842,988 entitled OPTICAL JUNCTION NODES FOR USE IN DATA CENTER NETWORKS and which claims priority to U.S. Provisional Patent Application No. 61/554,107 filed Nov. 1, 2011 entitled DATA CENTER NETWORK SWITCHING. This application is also related to U.S. patent application Ser. No. 13/651,213 filed Oct. 12, 2012 entitled DATA CENTER NETWORK ARCHITECTURE, U.S. patent application Ser. No. 13/651,224 filed Oct. 12, 2012 and U.S. patent application Ser. No. 13/651,255 filed issued on Dec. 1, 2015 as U.S. Pat. No. 9,204,207.

STATEMENT REGARDING FEDERALLY SPONSORED RESEARCH OR DEVELOPMENT

Not applicable

FIELD OF THE INVENTION

The present disclosure relates generally to data center network architectures and switching technologies, and more specifically to data center networks that can employ optical network topologies and optical nodes to efficiently allocate bandwidth within the data center networks, while reducing the physical interconnectivity requirements of the data center networks. The present disclosure further relates to systems and methods of affinity modeling in data center networks that allow computing resources within the data center networks to be controlled and provisioned based at least in part on the network topology and an application component topology, thereby enhancing overall application program performance.

BACKGROUND OF THE INVENTION

In recent years, university, government, business, and financial service entities, among others, have increasingly relied upon data center networks that incorporate racks of server computers ("servers") to implement application programs ("applications") for supporting their specific operational requirements, including, but not limited to, data base management applications, document and file sharing applications, searching applications, gaming applications, and financial trading applications. Such data center networks are generally expanding in terms of the number of servers incorporated therein, as well as the networking equipment needed to interconnect the servers for accommodating the data transfer requirements of the respective applications.

Conventional data center networks typically have hierarchical architectures, in which each server co-located in a particular rack is connected via one or more Ethernet connections to a top-of-rack Ethernet switch (the "top-of-rack switch"). A plurality of such top-of-rack switches form what is referred to herein as the "access layer", which is generally the lowest level of the hierarchical network architecture. The next higher level of the hierarchy is referred to herein as the "aggregation layer", which can include a plurality of Ethernet switches (the "aggregation switch(es)") and/or Internet protocol (IP) routers. Each top-of-rack switch in the access layer can be connected to one or more aggregation switches and/or IP routers in the aggregation layer. The highest level of the hierarchy is referred to herein as the "core layer", which generally includes a plurality of IP routers (the "core switches") that can be configured to provide ingress/egress points for the data center network. Each aggregation switch and/or IP router in the aggregation layer can be connected to one or more core switches in the core layer, which, in turn, can be interconnected to one another. In such conventional data center networks, the interconnections between the racks of servers, the top-of-rack switches in the access layer, the aggregation switches/IP routers in the aggregation layer, and the core switches in the core layer, are typically implemented using point-to-point Ethernet links.

Although conventional data center networks like those described above have been employed to satisfy the operational requirements of many university, government, business, and financial service entities, such conventional data center networks have drawbacks. For example, data communications between servers that are not co-located within the same rack may experience excessive delay (also referred to herein as "latency") within the data center networks, due to the multitude of switches and/or routers that the data may be required to traverse as it propagates "up", "down", and/or "across" the hierarchical architecture of the networks. Data communications between such servers may also experience latency within the respective switches and/or routers of the data center networks due to excessive node and/or link utilization. Further, because multiple paths may be employed to deliver broadcast and/or multicast data to different destinations within the data center networks, such broadcast and/or multicast data may experience excessive latency skew. Such latency and/or latency skew may be exacerbated as the sizes of the data center networks and/or their loads increase.

In addition, conventional data center networks typically include network management systems that employ configuration data for proper allocation of computing resources within the data center networks. However, such configuration data frequently lack contextual information, such as how the topology of a data center network should be configured in view of the available computing resources to achieve a desired level of application performance. For example, such network management systems may employ the Open Virtualization Format (also referred to herein as the "OVF standard") to facilitate the control and provisioning of such computing resources. However, the OVF standard generally lacks contextual information pertaining to the network topology, and may therefore be incapable of assuring that the available computing resources are being properly provisioned for the desired application performance level. As a result, problems with latency, data bottlenecks, etc., may be further exacerbated, thereby slowing down or otherwise inhibiting data movement within the data center networks.

It would therefore be desirable to have data center networks that avoid at least some of the drawbacks of the conventional data center networks described above.

BRIEF SUMMARY OF THE INVENTION

In accordance with the present disclosure, systems and methods of affinity modeling in data center networks are disclosed that allow bandwidth to be efficiently allocated with the data center networks, while reducing the physical interconnectivity requirements of the data center networks. Such systems and methods of affinity modeling in data center networks further allow computing resources within the data center networks to be controlled and provisioned based at least in part on the network topology and an application component topology, thereby enhancing overall application program performance.

In one aspect, the disclosed systems and methods of affinity modeling are employed in conjunction with a data center network architecture that includes one or more physical or logical optical ring networks. Each of the optical ring networks includes a plurality of optical nodes, in which at least two optical nodes each have an associated local co-resident controller. The data center network architecture further includes one or more central controllers, zero, one, or more governing central controllers, a functional component referred to herein as the "affinity modeling component", and an affinity-network topology database. Each of the co-resident controllers associated with the optical ring networks is communicably coupled to a respective one of the central controllers. Each co-resident controller is operative to send one or more messages to the respective central controller communicably coupled thereto. Moreover, each of the central controllers is operative to receive and process the messages sent to it by the co-resident controllers, and to control the respective co-resident controllers.

Each governing central controller can be communicably coupled to one or more of the central controllers. In an exemplary aspect, the governing central controller, the central controllers, and the local co-resident controllers can be configured to provide a hierarchy of network control. For example, the governing central controller may control the respective central controllers to perform load balancing with regard to network traffic carried on the optical ring networks. In addition, the governing central controller and the central controllers are each operative to receive information pertaining to the affinity-network topology from the affinity-network topology database. Having received the affinity-network topology information, the central controllers, in conjunction with the governing central controller, can control some or all of the co-resident controllers to modify and/or implement the affinity-network topology across the respective optical ring networks.

In another aspect, the affinity modeling component includes a plurality of functional components operative to generate the affinity-network topology information. In an exemplary aspect, the plurality of functional components can include at least an affinity element harvester, a network topology harvester, an affinity topology calculator, and an affinity-network topology calculator. The affinity element harvester is operative to harvest information pertaining to one or more affinity elements, along with their mappings to one or more physical elements within the optical ring networks. Each such affinity element is defined herein as an application component that may be virtualized (e.g., virtual machines, virtualized storage blocks, etc.) or non-virtualized (e.g., physical storage servers, units of non-virtualized software running on hardware platforms, hardware firewalls, hardware load balancers, etc.). Further, each affinity element can be a member of an affinity group, which is defined herein as a collection of servers or virtual machines (VMs), a cluster (e.g., a set of servers that are load balanced and provide high availability), and/or data center resident (or between multiple data centers) applications that require persistent interconnectivity bandwidth, low latency, multicast or broadcast services, and/or isolation from other services. The network topology harvester is operative to harvest information pertaining to the topology of the data center network architecture. The affinity topology calculator is operative to employ at least (1) the information pertaining to the affinity elements and their mappings to the physical elements within the network, (2) the information pertaining to the network topology, and/or (3) information pertaining to specific application requirements, to compute, calculate, derive, or otherwise obtain a logical topology (also referred to herein as the "affinity topology") describing a functional and/or performance-driven relationship between the affinity groups and/or the affinity elements. For example, the affinity topology can specify policies and attributes that describe communications between a plurality of application components in the network.

Using at least the information pertaining to the network topology and the affinity topology, the affinity-network topology calculator is operative to form or otherwise obtain a combined affinity-network topology that takes into account both the network topology and the affinity topology. Such a combined affinity-network topology is defined herein as an overall topology that can be obtained by logically combining, e.g., by logically stitching together or overlaying, the network topology and the affinity topology. For example, the affinity-network topology calculator may stitch together the network topology and the affinity topology by binding affinity elements to their counterparts in the network topology, yielding one or more logical links between the affinity groups/elements and the physical and/or virtualized elements within the data center network architecture. The central controllers are operative to receive information pertaining to the affinity-network topology, and, based at least on the received information, to control one or more optical nodes, and zero, one, or more optical junction nodes, to modify the network topology, as appropriate, for implementing the affinity-network topology within the data center network, thereby providing enhanced levels of application program performance and network utilization.

In a further aspect, a system for providing enhanced application program performance and network utilization in a network includes a modeling component. The network has an associated topology and a current network state, which, as employed herein, pertains to the operational status of all of the network segments in the network and the sources and destinations to which that operational status relates, as well as the endpoint addresses (such as MAC or IP addresses) of all of the host computers communicably coupled to the respective nodes on the network. A "network segment" is defined herein as a unidirectional link in the network from a source to a destination considered at the applicable OSI model layer, e.g., layer-1, layer-2, or layer-3. The topology associated with the network includes a network topology and an affinity topology. The modeling component has at least one processor operative to execute at least one program out of at least one memory to model an affinity-network topology that represents a logical combination of the affinity topology and the network topology. The system further includes a central controller operative to receive information pertaining to at least the affinity-network topology, and to compute one or more forwarding topologies based at least in part on the affinity-network topology. Each forwarding topology identifies one or more network segments for forwarding traffic through the network. For example, the forwarding topologies can represent a network abstraction layer, and the affinity-network topology can represent a workload abstraction layer. The central controller is further operative to provide the forwarding topologies for use in deterministically arriving at a consistent end-to-end forwarding configuration for the network as a function of the current network state.

In another aspect, a method of providing enhanced application program performance and network utilization in a network includes modeling an affinity-network topology by a computerized modeling component, and receiving, at a central controller, information pertaining to at least the affinity-network topology. The method further includes computing, by the central controller, one or more forwarding topologies based at least in part on the affinity-network topology, and providing, by the central controller, the forwarding topologies for use in deterministically arriving at the consistent end-to-end forwarding configuration for the network as a function of the current network state.

Other features, functions, and aspects of the invention will be evident from the Drawings and/or the Detailed Description of the Invention that follow.

BRIEF DESCRIPTION OF THE SEVERAL VIEWS OF THE DRAWINGS

The invention will be more fully understood with reference to the following Detailed Description of the Invention in conjunction with the drawings of which:

FIG. 8a is a diagram of an exemplary data structure for the network topology of FIG. 3;

FIG. 8b is a diagram of an exemplary data structure for the affinity topology of FIG. 4;

FIG. 8c is a diagram of an exemplary data structure for the affinity-network topology of FIG. 5;

FIG. 14a is a block diagram of another exemplary affinity-network topology for use in determining the bandwidth and oversubscription between a plurality of affinity groups;

FIG. 14b is a diagram of an exemplary bandwidth versus hops descriptor for a node included in the affinity-network topology of FIG. 14a;

FIG. 15 is a block diagram of another exemplary affinity-network topology for use in determining the total number of single points of failure between a plurality of affinity groups, and the total number of failures before affinity group disconnection;

DETAILED DESCRIPTION OF THE INVENTION

The disclosures of U.S. patent application Ser. No. 13/651,213 filed Oct. 12, 2012 entitled DATA CENTER NETWORK ARCHITECTURE, U.S. patent application Ser. No. 13/651,224 filed Oct. 12, 2012 entitled CONTROL AND PROVISIONING IN A DATA CENTER NETWORK WITH AT LEAST ONE CENTRAL CONTROLLER, U.S. patent application Ser. No. 13/651,255 filed Oct. 12, 2012 entitled HIERARCHY OF CONTROL IN A DATA CENTER NETWORK, U.S. Provisional Patent Application No. 61/554,107 filed Nov. 1, 2011 entitled DATA CENTER NETWORK SWITCHING, U.S. patent application Ser. No. 13/528,501 filed Jun. 20, 2012 entitled OPTICAL ARCHITECTURE AND CHANNEL PLAN EMPLOYING MULTI-FIBER CONFIGURATIONS FOR DATA CENTER NETWORK SWITCHING, and U.S. patent application Ser. No. 13/528,211 filed Jun. 20, 2012 entitled OPTICAL JUNCTION NODES FOR USE IN DATA CENTER NETWORKS, are incorporated herein by reference in their entirety.

Systems and methods of affinity modeling in data center networks are disclosed that allow bandwidth to be efficiently allocated within the data center networks, while reducing the physical interconnectivity requirements of the data center networks. Such systems and methods of affinity modeling in data center networks further allow computing resources within the data center networks to be controlled and provisioned based at least in part on the network topology and an application component topology. Such control and provisioning of computing resources includes determining a combined affinity-network topology for a data center network, and controlling one or more optical nodes and zero, one, or more optical junction nodes to implement the affinity-network topology within the data center network, thereby providing an enhanced level of application program performance.

Figure 1:
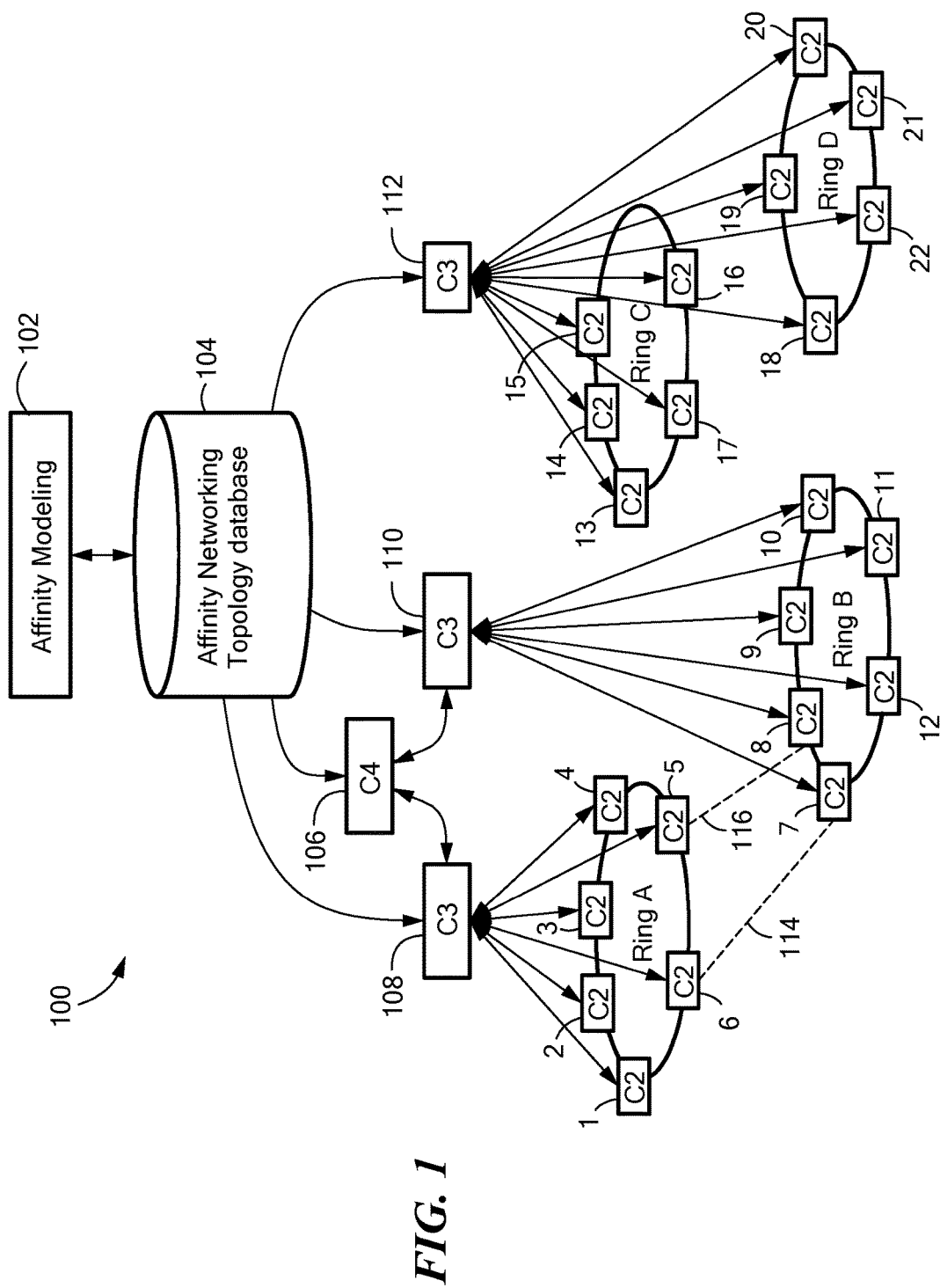
FIG. 1 is a block diagram of an exemplary data center network architecture, in accordance with the present disclosure.

FIG. 1 depicts an illustrative embodiment of a data center network 100. As shown in FIG. 1, the data center network 100 includes a plurality of physical or logical optical ring networks A, B, C, and D. Each of the optical ring networks A, B, C, D includes a plurality of optical nodes, each of which is defined herein as a network node that can include downlink ports for connection to host computers or other attached devices, uplink ports that are connectable to other optical nodes in the network, and a packet switch, a circuit switch, and/or an optical switch, as herein described. Each optical node has an associated co-resident controller (also referred to herein as "C2"). For example, the optical ring network A includes six (6) optical nodes 1-6 that have six (6) associated co-resident controllers (C2), respectively; the optical ring network B includes six (6) optical nodes 7-12 that have six (6) associated co-resident controllers (C2), respectively; the optical ring network C includes five (5) optical nodes 13-17 that have five (5) associated co-resident controllers (C2), respectively; and, the optical ring network D includes five (5) optical nodes 18-22 that have five (5) associated co-resident controllers (C2), respectively. The data center network 100 further includes a plurality of central controllers 108, 110, 112 (also referred to herein as "C3"), a governing central controller 106 (also referred to herein as "C4"), a functional component 102 referred to herein as the "affinity modeling component", and an affinity-network topology database 104. It is noted that the data center network 100 may alternatively include any other suitable physical or logical network configuration(s), including, but not limited to, linear network configuration(s), ring network configuration(s), chordal ring network configuration(s), multidimensional chordal ring network configuration(s), and/or 2-dimensional or higher torus network configuration(s). It is further noted that such physical or logical network configuration(s) may include optical node(s), non-optical node(s), node(s) coupled to optical network(s), or node(s) coupled to non-optical network(s).

Each of the co-resident controllers (C2) associated with the optical ring networks A, B, C, and D is communicably coupled to a respective one of the central controllers (C3) 108, 110, 112. For example, the co-resident controllers (C2) associated with the optical ring network A are each communicably coupled to the central controller (C3) 108, and the co-resident controllers (C2) associated with the optical ring network B are each communicably coupled to the central controller (C3) 110. Further, the co-resident controllers (C2) associated with the optical ring network C are each communicably coupled to the central controller (C3) 112, and, likewise, the co-resident controllers (C2) associated with the optical ring network D are each communicably coupled to the central controller (C3) 112. Each co-resident controller (C2) is operative to transmit one or more messages to the respective central controller (C3) communicably coupled thereto. Moreover, each of the central controllers (C3) 108, 110, 112 is operative to receive and process the messages sent to it by the co-resident controllers (C2), and to control the respective co-resident controllers (C2). As shown in FIG. 1, each of the central controllers (C3) 108, 110, 112 can control the respective co-resident controllers (C2) included in one or more of the optical ring networks A, B, C, D. For example, the central controller (C3) 108 can control the co-resident controllers (C2) associated with the optical ring network A, the central controller (C3) 110 can control the co-resident controllers (C2) associated with the optical ring network B, and the central controller (C3) 112 can control the co-resident controllers (C2) associated with the optical ring networks C, D.

As further shown in FIG. 1, the governing central controller (C4) 106 is communicably coupled to the central controller (C3) 108 and the central controller (C3) 110. The governing central controller (C4) 106 is operative to control the central controllers (C3) 108, 110 communicably coupled thereto. For example, the governing central controller (C4) 106 may control the central controllers (C3) 108, 110 to perform load balancing with regard to network traffic carried on the optical ring networks A, B. In addition, each of the governing central controller (C4) 106, the central controller (C3) 108, the central controller (C3) 110, and the central controller (C3) 112 is operative to receive information pertaining to the affinity-network topology from the affinity-network topology database 104. Having received the affinity-network topology information, the central controllers (C3) 108, 110, 112, in conjunction with the governing central controller (C4) 106, are operative to control some or all of the co-resident controllers (C2) to modify and/or implement the affinity-network topology across the respective optical ring networks A, B, C, D.

Figure 2:
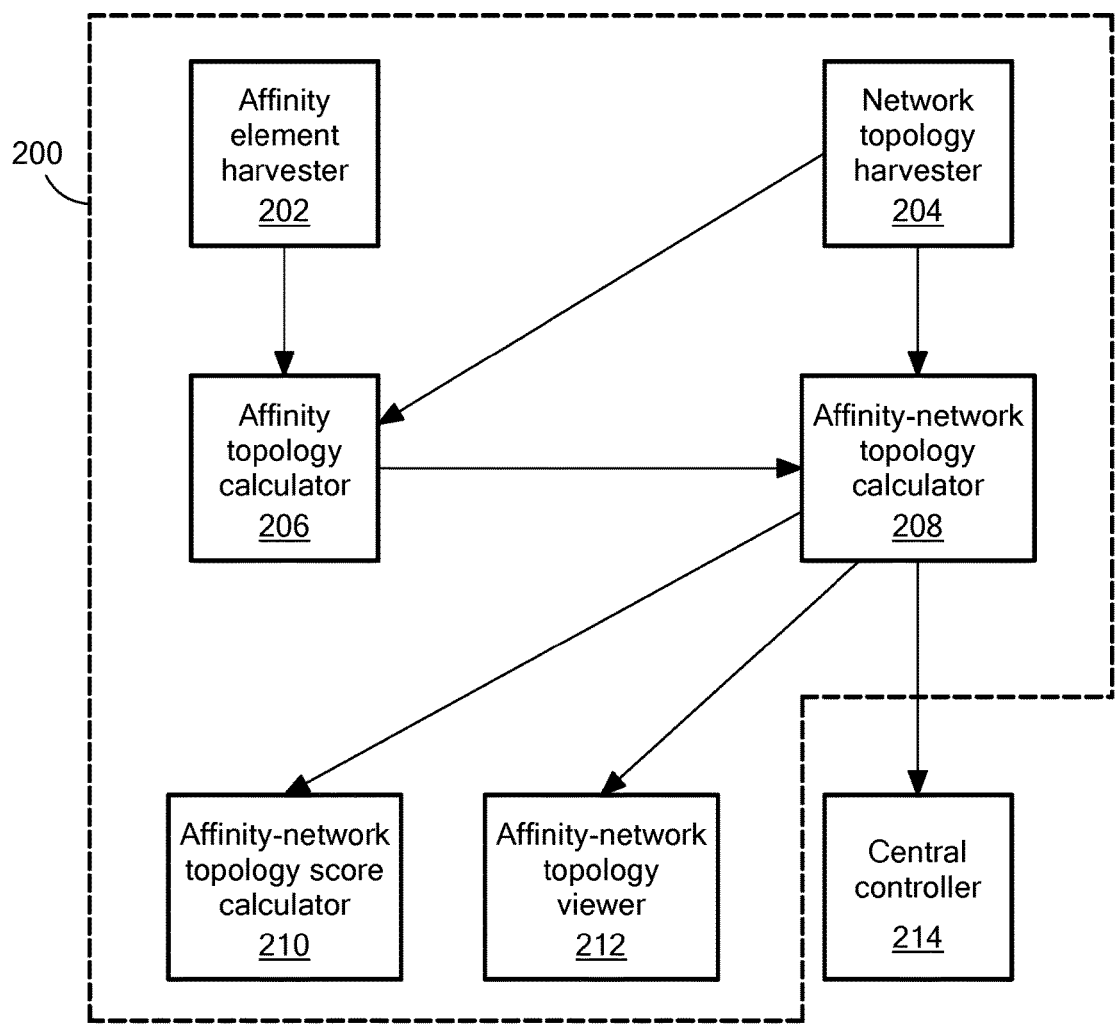
FIG. 2 is a block diagram of a plurality of exemplary functional components that can be employed to modify and/or implement an affinity-network topology within the data center network architecture of FIG. 1.

The affinity modeling component 102 (see FIG. 1) includes a plurality of functional components (corresponding to reference numerals 202, 204, 206, 208, 210, 212; see FIG. 2) operative to generate the affinity-network topology information. FIG. 2 depicts a system 200 of such functional components that can be included in the affinity modeling component 102. As shown in FIG. 2, the plurality of functional components can include an affinity element harvester 202, a network topology harvester 204, an affinity topology calculator 206, an affinity-network topology calculator 208, an affinity-network topology score calculator 210, and an affinity-network topology viewer 212. The affinity element harvester 202 is operative to harvest information pertaining to one or more affinity elements, along with their mappings to one or more physical elements within at least one network (such as at least one of the optical ring networks A, B, C, D; see FIG. 1). Each such affinity element is defined herein as an application component that may be a virtualized application component (e.g., virtual machines, virtualized storage blocks, etc.) or a non-virtualized application component (e.g., physical storage servers, units of non-virtualized software running on hardware platforms, hardware firewalls, hardware load balancers, etc.). Further, each affinity element can be a member of an affinity group, which is defined herein as a collection of servers or virtual machines (VMs), a cluster (e.g., a set of servers that are load balanced and provide high availability), and/or data center resident applications that require persistent interconnectivity bandwidth, low latency, multicast or broadcast services, and/or isolation from other services.

With reference to FIG. 2, the network topology harvester 204 is operative to harvest information pertaining to the topology of a network (also referred to herein as the "network topology"), such as the data center network 100 (see FIG. 1). The affinity topology calculator 206 is operative to employ at least (1) the information pertaining to the affinity elements and their mappings to the physical elements within the network, (2) the information pertaining to the network topology, and/or (3) information pertaining to specific requirements for application performance, e.g., as provided by a user within a predetermined affinity descriptor modeling framework, to compute, calculate, derive, or otherwise obtain a logical topology (also referred to herein as the "affinity topology") describing a functional and/or performance-driven relationship between the affinity groups/elements.

Using at least the information pertaining to the network topology and the affinity topology, the affinity-network topology calculator 208 is operative to form or otherwise obtain a combined affinity-network topology that takes into account both the network topology and the affinity topology. Such a combined affinity-network topology is defined herein as an overall topology that can be obtained by effectively stitching together or overlaying the network topology and the affinity topology. For example, the affinity-network topology calculator 208 may stitch together the network topology and the affinity topology by binding affinity elements to their counterparts in the network topology, yielding one or more logical links between the affinity groups/elements and the physical and/or virtualized elements within the data center network 100 (see FIG. 1). At least one central controller, such as a representative central controller 214, is operative to receive information pertaining to the affinity-network topology from the affinity-network topology calculator 208, and, based at least on the received information, to control one or more optical nodes, and zero, one, or more optical junction nodes, to modify the network topology, as appropriate, for implementing the affinity-network topology within the data center network, thereby providing an enhanced level of application program performance. Optical junction nodes are defined herein as optical nodes that do not include a packet switch interconnecting with downlink and uplink ports. Such optical junction nodes can connect to one or more other optical junction nodes, as well as to one or more optical nodes, through their uplink ports. It is noted that such optical junction nodes may or may not include downlink ports (access ports). Such optical junction nodes can also connect to one or more external switches or routers through their downlink ports.

Using at least the affinity-network topology, the affinity-network topology score calculator 210 is operative to determine an affinity group score for each affinity group, an affinity link score for each affinity link, and a network-wide affinity score for the overall network. The affinity-network topology viewer 212 is operative to graphically display the affinity-network topology, and to display a set of affinity group scores for each affinity group, a set of affinity link scores for each affinity link, and the network-wide affinity score. Based at least on the affinity group scores, the affinity link scores, and/or the network-wide affinity score, the user can specify an expected level of performance of the application running within the network, as well as determine the actual level of application performance. Moreover, by perturbing and/or modifying the network topology and/or the affinity topology, and obtaining new affinity group scores for each affinity group, new affinity link scores for each affinity link, and a new network-wide affinity score for the network, the user can use the disclosed systems and methods to determine, based at least on the affinity group scores, the affinity link scores, and/or the network-wide affinity score, the network topology and/or the affinity topology that can provide a desired level of application performance.

Figure 3:
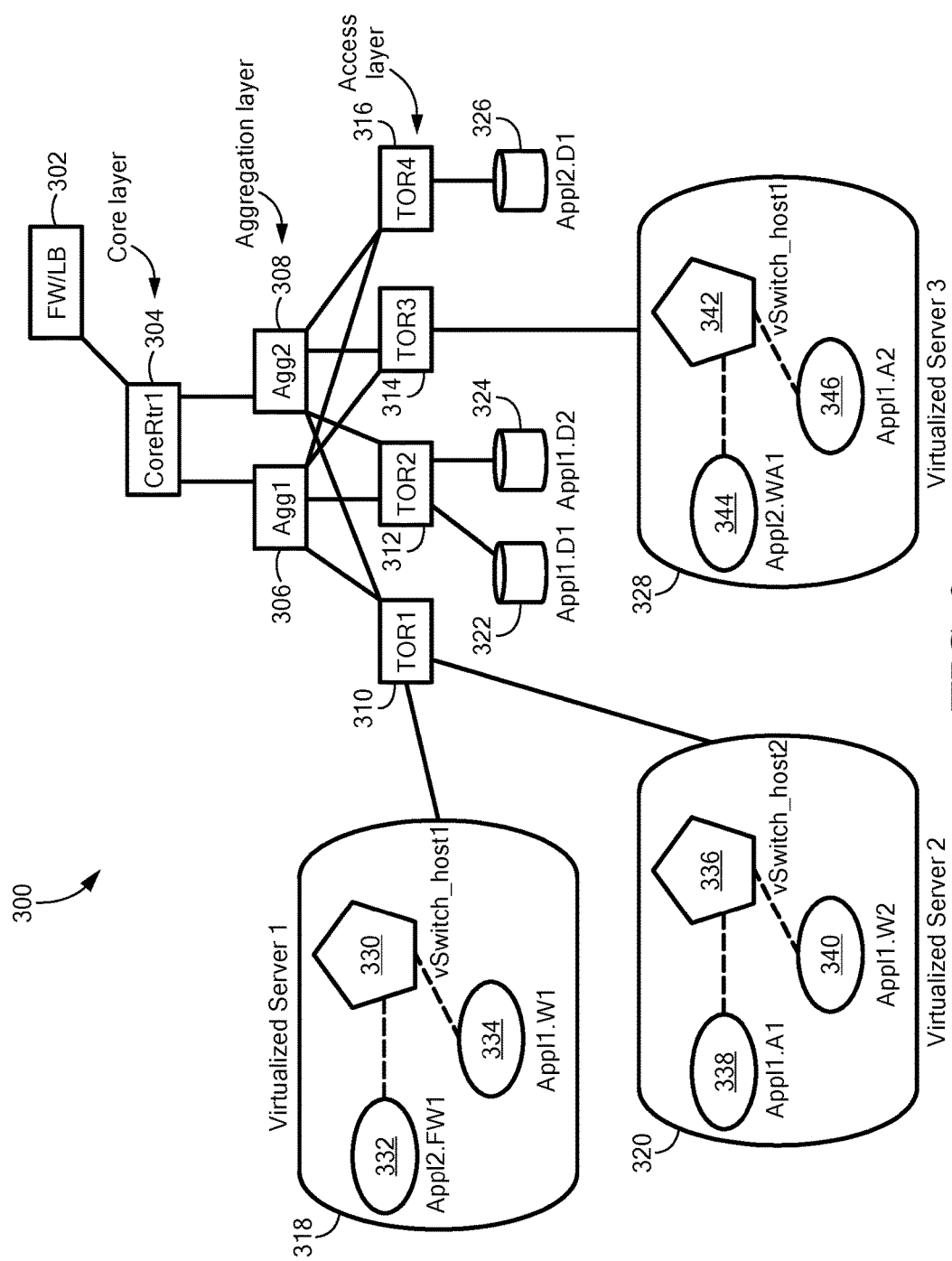
FIG. 3 is a block diagram of an exemplary network topology.
Figure 4:
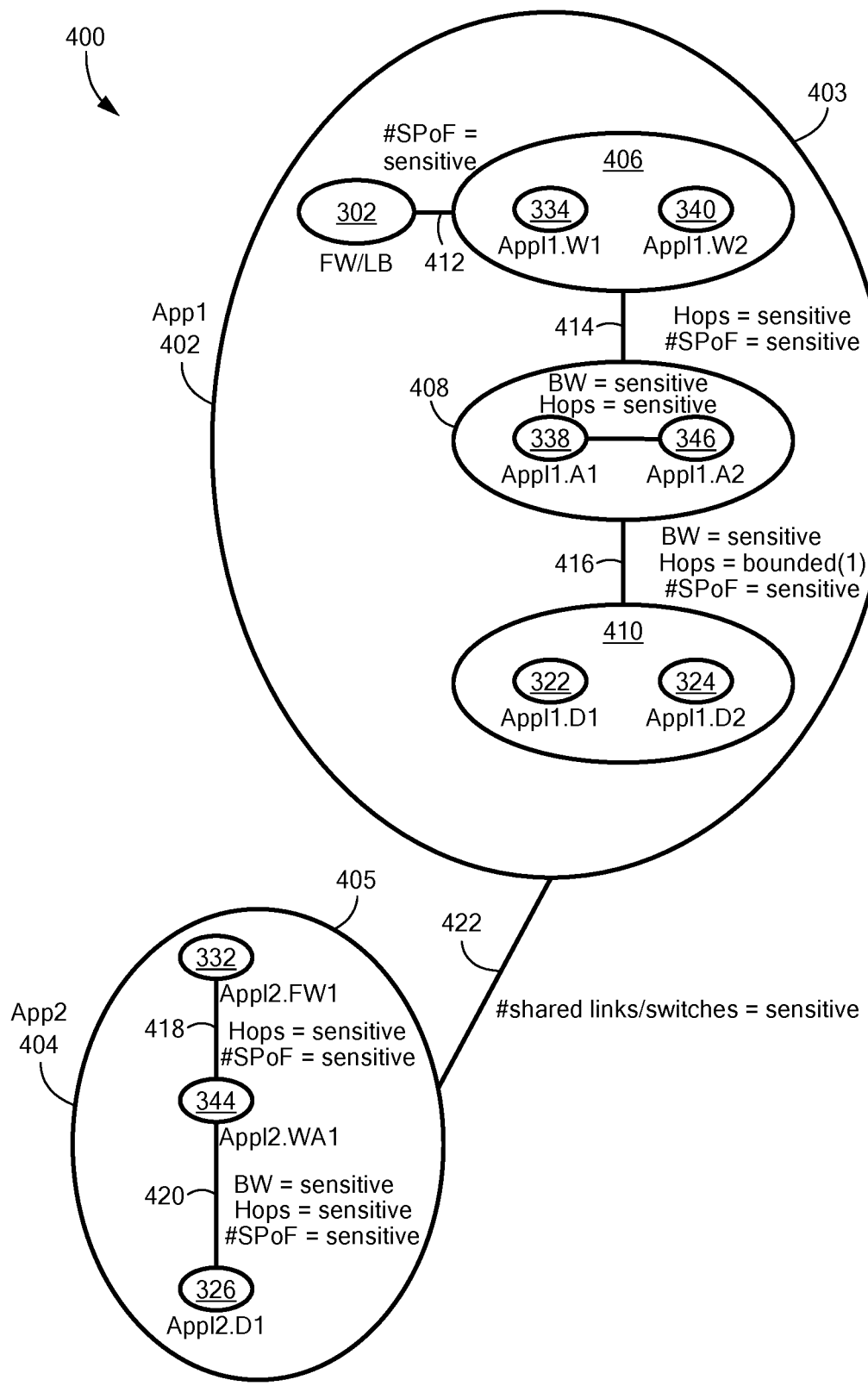
FIG. 4 is a block diagram of an exemplary affinity topology derived from the network topology of FIG. 3.

The operation of the affinity modeling component 102 of FIG. 1 is further described below with reference to the following illustrative example and FIGS. 3-6. In this example, an exemplary network topology 300 is illustrated in FIG. 3, and an exemplary logical affinity topology 400 is illustrated in FIG. 4. The affinity topology 400 includes a first plurality of affinity elements within a first exemplary application, App1 402, and a second plurality of affinity elements within a second exemplary application, App2 404.

As shown in FIG. 3, the network topology 300 includes a core layer, an aggregation layer, and an access layer. The network topology 300 further includes a plurality of exemplary network elements, namely, a firewall/load balancer (FW/LB) 302, a core router (CoreRtrl) 304 in the core layer, a plurality of aggregation servers (Agg1, Agg2) 306, 308 in the aggregation layer, and a plurality of top-of-rack servers (TOR1, TOR2, TOR3, TOR4) 310, 312, 314, 316 in the access layer. The top-of-rack server 310 is communicably coupled to a first virtual machine (virtualized server 1) 318 and a second virtual machine (virtualized server 2) 320, and the top-of-rack server 314 is communicably coupled to a third virtual machine (virtualized server 3) 328. A virtual machine ("VM") is defined herein as a software entity that provides functionality to applications, and is substantially equivalent to the functionality of a dedicated, hardware computing platform (e.g., a server). Such a virtual machine generally requires a hypervisor (e.g., a host operating system) to be installed on the actual hardware platform where it resides. It is noted that one or more virtual machines can be installed on top of a single hypervisor.

The first VM 318 is associated with a virtual switch (vSwitch_host1) 330, a first web server 334 for the first application (Appl1.W1), and a firewall 332 for the second application (Appl2.FW1). The second VM 320 is associated with a virtual switch (vSwitch_host2) 336, a first application server 338 for the first application (Appl1.A1), and a second web server 340 for the first application (Appl1.W2). The third VM 328 is associated with a virtual switch (vSwitch_host1) 342, a web server 344 for the second application (Appl2.W1), and a second application server 346 for the first application (Appl1.A2). A virtual switch ("vSwitch") is defined herein as a software entity that provides networking functionality to a group of VMs and/or other vSwitches, and is substantially equivalent to the functionality provided by a physical switch to a group of physical machines and/or other physical switches. It is noted that different implementations of vSwitches can have varying levels of functionality, e.g., some implementations of a vSwitch may not implement a spanning tree protocol, and/or may not allow vSwitch-to-vSwitch connections. Similarly, while some implementations of a vSwitch are on top of a single hypervisor and are bound to VMs on the same hypervisor, other implementations include a distributed vSwitch that can be spread across multiple hypervisors, and/or can be bound to VMs that exist on different hypervisors.

With reference to the first VM 318, the firewall 332 and the first web server 334 are each typically communicably coupled to the virtual switch 330 through a virtual network interface card ("vNIC"). Similarly, with reference to the second VM 320, the first application server 338 and the second web server 340 are each typically communicably coupled to the virtual switch 336 through a vNIC; and, with reference to the third VM 328, the web server 344 and the second application server 346 are each typically communicably coupled to the virtual switch 342 through a vNIC. A vNIC is defined herein as a software entity that provides functionality to a virtual machine (VM), and is substantially equivalent to the functionality provided by a physical network interface card (NIC) to a physical machine.

As further shown in FIG. 3, the top-of-rack server 312 is communicably coupled to a first data store 322 for the first application (Appl1.D1), and a second data store 324 for the first application (Appl1.D2). Similarly, the top-of-rack server 316 is communicably coupled to a data store 326 for the second application (Appl2.D1).

As shown in FIG. 4, the first plurality of affinity elements within the first application, App1 402, includes the firewall/load balancer 302, the first web server 334, the second web server 340, the first application server 338, the second application server 346, the first data store 322, and the second data store 324. Moreover, the second plurality of affinity elements within the second application, App2 404, includes the firewall 332, the web server 344, and the data store 326. For example, with reference to the first application, App1 402, the firewall/load balancer 302, the first web server 334, the second web server 340, the first application server 338, the second application server 346, the first data store 322, and the second data store 324 can be members of an affinity group 403. Similarly, with reference to the second application, App2 404, the firewall 332, the web server 344, and the data store 326 can be members of an affinity group 405. In addition, the first web server 334 and the second web server 340 can be members of an affinity group 406, the first application server 338 and the second application server 346 can be members of an affinity group 408, and the first data store 322 and the second data store 324 can be members of an affinity group 410. Each of the affinity groups 406, 408, 410 is contained within the affinity group 403.

With further reference to the first application, App1 402, it is noted that, within an exemplary affinity descriptor modeling framework (as further described below), one or more affinity requirements can be established for (1) an affinity link 412 coupling the firewall/load balancer 302 to the affinity group 406, (2) an affinity link 414 coupling the affinity group 406 to the affinity group 408, and (3) an affinity link 416 coupling the affinity group 408 to the affinity group 410. With further reference to the second application, App2 404, one or more affinity requirements can also be established for (1) an affinity link 418 coupling the firewall 332 to the web server 344, and (2) an affinity link 420 coupling the web server 344 to the data store 326. In addition, one or more affinity requirements can be established for an affinity link 422 coupling the affinity group 403 to the affinity group 405. Such affinity requirements can include (1) communication-related affinity requirements relating to bandwidth, switch hops, layer-1 hops, latency, multicast dispersion, oversubscription, underlying network state, etc., (2) reliability-related affinity requirements relating to layer-2 switch failures, layer-3 router failures, link failures, single points of failure, etc., (3) security-related affinity requirements relating to shared physical machines, shared switches, isolation, communication path interconnection, etc., or any other suitable affinity requirements. As employed herein, the terms "layer-1", "layer-2", and "layer-3" correspond to the physical layer, the data link layer, and the network layer, respectively, of the Open System Interconnection (OSI) model.

For example, with regard to the first application, App1 402, the affinity link 412 coupling the firewall/load balancer 302 to the affinity group 406 can have a reliability-related affinity requirement relating to single points of failure ("#SPoF=sensitive"), the affinity link 414 coupling the affinity group 406 to the affinity group 408 can have a communication-related affinity requirement relating to hops ("Hops=sensitive") and a reliability-related affinity requirement relating to single points of failure ("#SPoF=sensitive"), and the affinity link 416 coupling the affinity group 408 to the affinity group 410 can have two communication-related affinity requirements relating to bandwidth ("BW=sensitive") and hops ("Hops=bounded (1)"), and a reliability-related affinity requirement relating to single points of failure ("#SPoF=sensitive"). With regard to the second application, App2 404, the affinity link 418 coupling the firewall 332 to the web server 344 can have a communication-related affinity requirement relating to hops, ("Hops=sensitive") and a reliability-related affinity requirement relating to single points of failure ("#SPoF=sensitive"), and the affinity link 420 coupling the web server 344 to the data store 326 can have two communication-related affinity requirements relating to bandwidth ("BW=sensitive") and hops ("Hops=sensitive"), and a reliability-related affinity requirement relating to single points of failure ("#SPoF=sensitive"). In addition, the affinity link 422 coupling the affinity group 403 to the affinity group 405 can have a security-related affinity requirement relating to the number of shared links between the respective affinity groups 403, 405.

With reference to FIG. 2, the network topology harvester 204 can harvest information pertaining to the network topology 300 (see FIG. 3). Further, the affinity element harvester 202 (see FIG. 2) can harvest information pertaining to the first plurality of affinity elements within the first application, App1 402 (see FIG. 4), and the second plurality of affinity elements within the second application, App2 404 (see FIG. 4). The affinity topology calculator 206 (see FIG. 2) is operative to employ at least (1) the information pertaining to the first and second pluralities of affinity elements and their mappings to the physical elements within the network topology 300, (2) the information pertaining to the network topology 300, and/or (3) information pertaining to specific application requirements, e.g., as provided by the user within the predetermined affinity descriptor modeling framework, to compute, calculate, derive, or otherwise obtain the affinity topology 400 (see FIG. 4).

Figure 5:
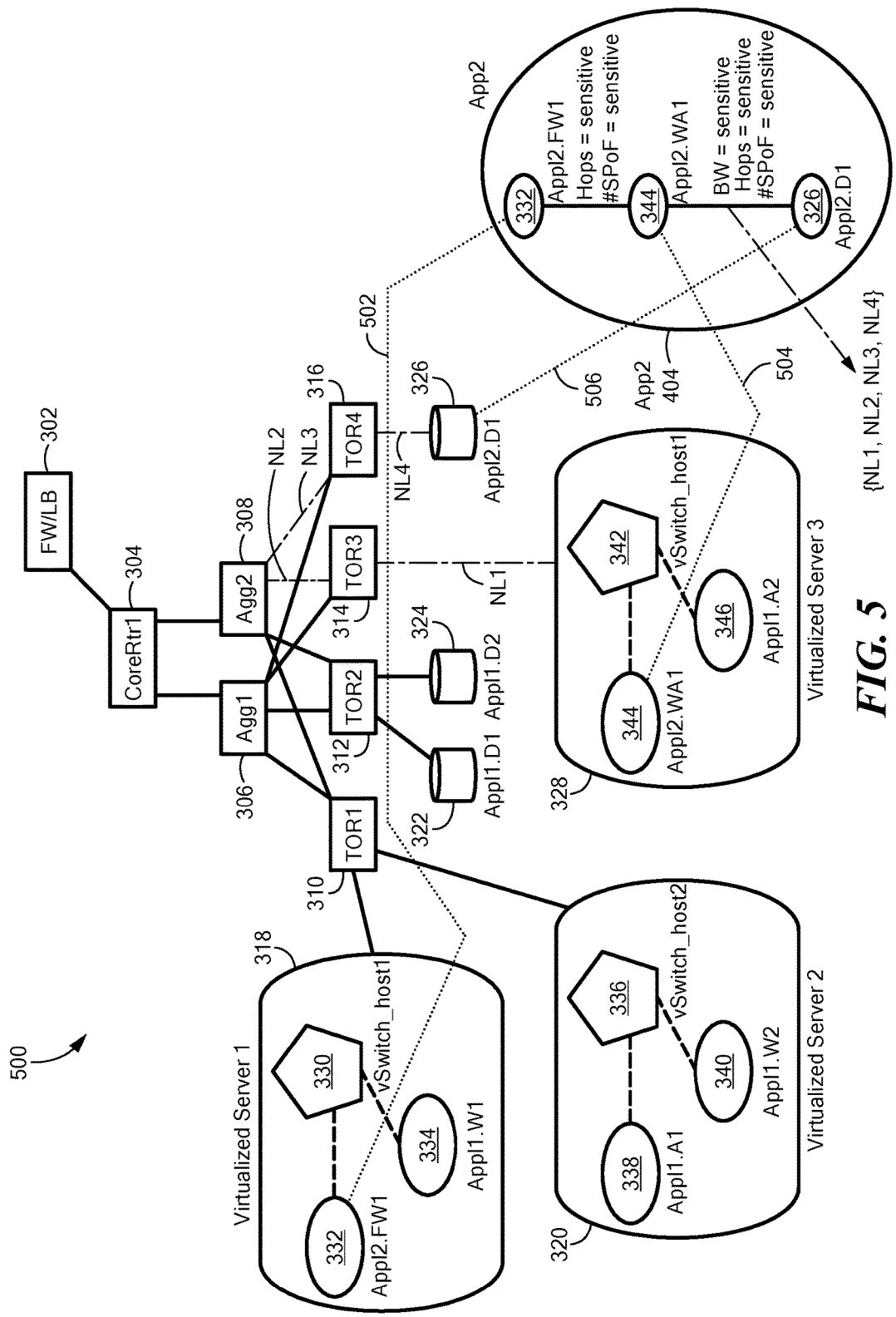
FIG. 5 is a block diagram of an exemplary affinity-network topology obtained by effectively stitching together or overlaying the network topology of FIG. 3 and the logical affinity topology of FIG. 4.

With further reference to FIG. 2, the affinity-network topology calculator 208 can effectively stitch together or overlay the network topology 300 (see FIG. 3) and the affinity topology 400 (see FIG. 4) to obtain an exemplary combined affinity-network topology 500 (see FIG. 5). As shown in FIG. 5, the affinity-network topology 500 includes a portion of the affinity topology 400 (see FIG. 4) relating to the second application, App2 404, overlaid upon the network topology 300 (see FIG. 3). It is noted that the portion of the affinity topology 400 relating to the first application, App1 402, is omitted from affinity-network topology 500 of FIG. 5 for clarity of illustration. Within the affinity-network topology 500, the firewall 332 of the second application, App2 404, corresponds to the firewall 332 associated with the first VM 318 (as indicated by a link 502), the web server 344 of the second application, App2 404, corresponds to the web server 344 associated with the third VM 328 (as indicated by a link 504), and the data store 326 of the second application, App2 404, corresponds to the data store 326 communicably coupled to the top-of-rack server 316 (as indicated by a link 506). Within the affinity-network topology 500, each affinity element of the affinity topology 400 (see FIG. 4), and each network element of the network topology 300 (see FIG. 3), is referred to herein as an affinity-network node. Further, each of the links 502, 504, 506 is referred to herein as an association link.

With regard to the affinity link 420 (see FIG. 4) coupling the web server 344 to the data store 326 of the second application, App2 404, the two communication-related affinity requirements relating to bandwidth ("BW=sensitive") and hops ("Hops=sensitive"), and the reliability-related affinity requirement relating to single points of failure ("#SPoF=sensitive"), have corresponding affinity requirements associated with (1) a network link, NL1, coupling the top-of-rack server 314 to the third VM 328, (2) a network link, NL2, coupling the aggregation server 308 to the top-of-rack server 314, (3) a network link, NL3, coupling the aggregation server 308 to the top-of-rack server 316, and (4) a network link, NL4, coupling the top-of-rack server 316 to the data store 326. Each network link (e.g., the network links NL1, NL2, NL3, NL4) in the network topology 300, each affinity link 412, 414, 416, 418, 420, 422 in the affinity topology 400, and each association link 502, 504, 506 in the affinity-network topology 500, is referred to herein as an affinity-network link.

Figure 6:
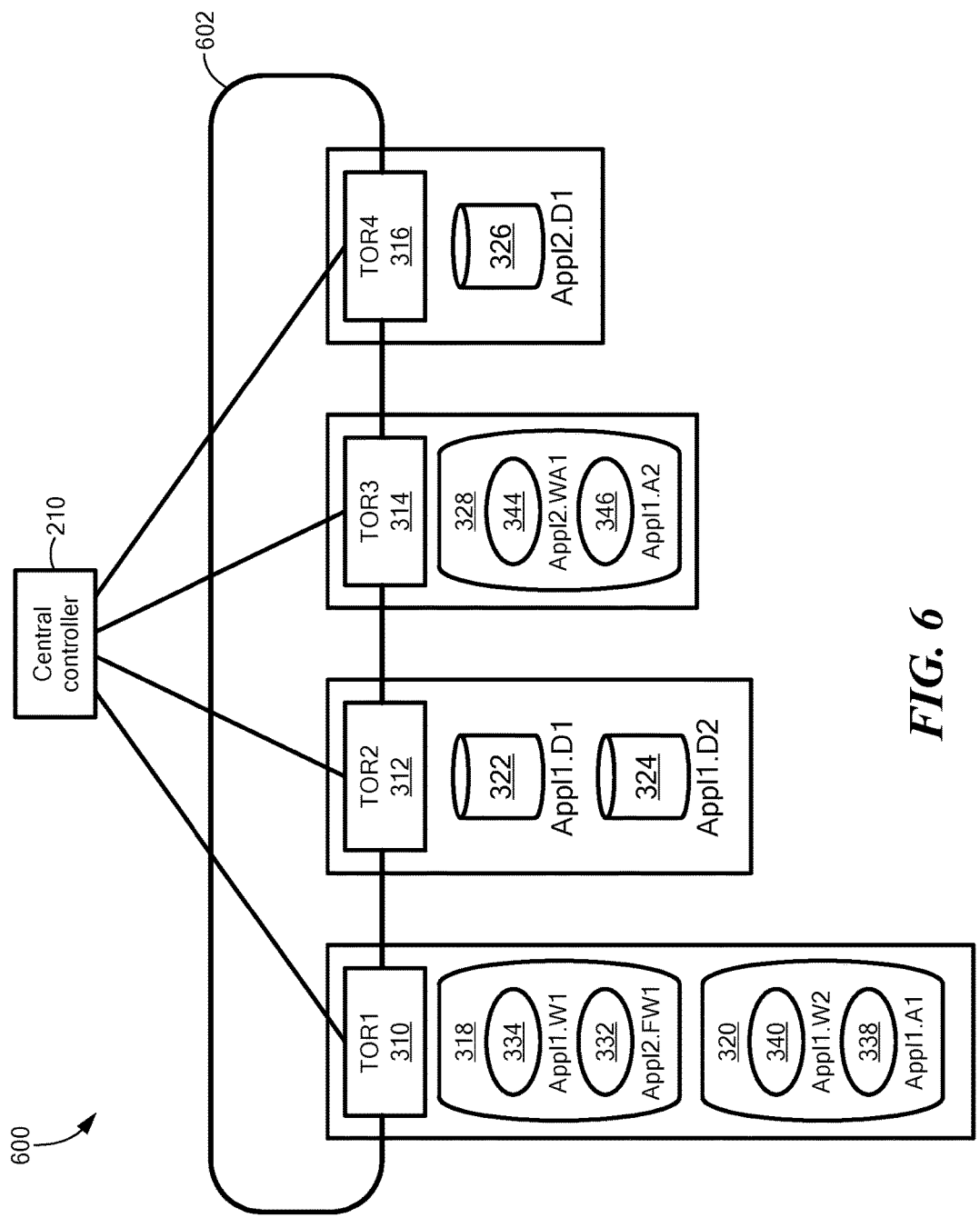
FIG. 6 is a block diagram of an exemplary data center network, illustrating the implications of centralized control of nodes on the network having the network topology of FIG. 3.

As described above, the representative central controller 214 (see FIG. 2) can receive the information pertaining to the affinity-network topology from the affinity-network topology calculator 208, and, based at least on the received information, control one or more optical nodes, as well as zero, one, or more optical junction nodes, to modify a network topology, as appropriate, for implementing the affinity-network topology within a data center network, thereby providing enhanced application performance. FIG. 6 depicts an exemplary data center network 600 that illustrates exemplary implications of such centralized control of optical nodes by the central controller 214. As shown in FIG. 6, the aggregation servers 306, 308 previously included in the aggregation layer of the data center network 300 (see FIG. 3) can effectively be eliminated from the data center network 600 (see FIG. 6). In addition, the top-of-rack servers 310, 312, 314, 316 previously included in the access layer of the data center network 300 (see FIG. 3) are arranged on a logical ring network 602 within the data center network 600 (see FIG. 6). For example, the logical ring network 602 can be implemented as a logical optical ring network. Further, the top-of-rack server 310 (and its associated VMs 318, 320), the top-of-rack server 312 (and its associated data stores 322, 324), the top-of-rack server 314 (and its associated VM 328), and the top-of-rack server 316 (and its associated data store 326), can each be implemented as an optical node on the logical optical ring network.

Figure 7:
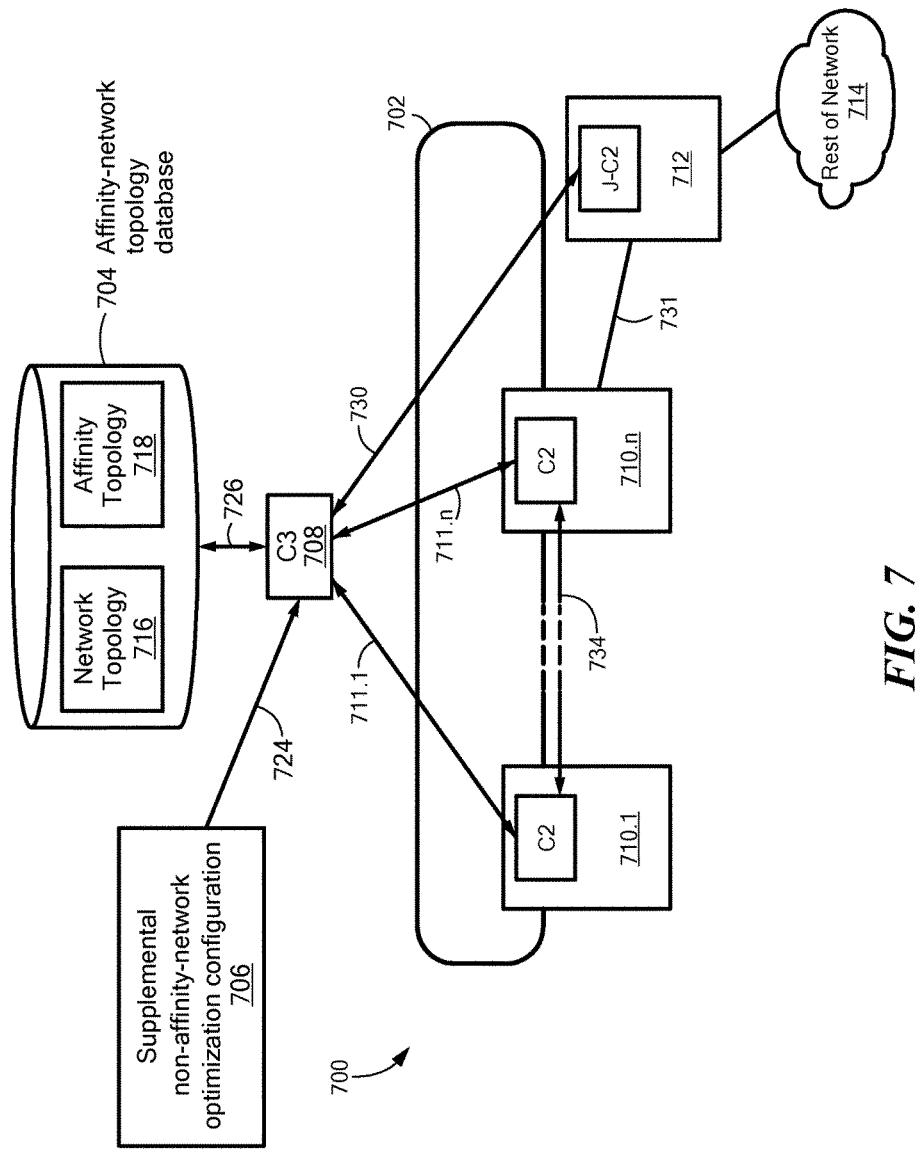
FIG. 7 is a block diagram of another exemplary data center network, illustrating the implications of centralized control of optical nodes on an optical ring network.

FIG. 7 depicts another exemplary data center network 700, illustrating exemplary implications of centralized control of a plurality of optical nodes 710.1-710.n, as well as an optical junction node 712, by a central controller (C3) 708. As shown in FIG. 7, the central controller (C3) 708 can receive information pertaining to the affinity-network topology from an affinity-network topology database 704 over a controller interface 726. The central controller (C3) 708 can also receive information pertaining to a supplemental non-affinity-network configuration 706 over a controller interface 724. For example, a governing central controller (C4) may be the source of such information pertaining to the supplemental non-affinity-network configuration. Such a supplemental non-affinity-network configuration can correspond to network operation preferences that are specified separately from the affinity topology, such as, for a set of specific links, keeping the link utilization below a given threshold, prioritizing specific flows according to a time schedule, etc.

As further shown in FIG. 7, the optical nodes 710.1-710.n are arranged on a logical optical ring network 702. Each of the optical nodes 710.1-710.n includes a co-resident controller (C2) communicably coupled to the central controller (C3) 708, which, for example, can provide functionality like that provided by the central controllers (C3) 108, 110, 112 (see FIG. 1). Each of the optical nodes 710.1-710.n can further include a switch (e.g., a packet switch, a packet switch and a cross-point switch, or a packet switch and a cross-bar switch), and a forwarding information base (FIB). Specifically, the co-resident controllers (C2) associated with the optical nodes 710.1-710.n are communicably coupled to the central controller (C3) 708 by controller interfaces 711.1-711.n, respectively. Similarly, the optical junction node 712 is communicably coupled to the central controller (C3) 708 by a controller interface 730. For example, the optical nodes 710.1-710.n can have layer-2 or layer-3 connectivity to the central controller (C3) 708. Further, each of the optical nodes can employ in-band management through a switch fabric, or out-of-band management. The optical junction node 712 can be managed in-band or out-of-band.

In addition, each of the co-resident controllers (C2) associated with the respective optical nodes 710.1-710.n (see FIG. 7) is communicably coupled to one or more adjacent co-resident controllers (C2) on the optical ring network 702 by a common control channel, namely, a supervisor channel 734, without mixing any control traffic with the data plane. For example, the co-resident controllers (C2) can employ the supervisor channel 734 to perform at least the following exemplary tasks: (1) detect incorrect wiring and/or fiber connections (e.g., "east-to-east" instead of "east-to-west"); (2) assist in locating physical wiring and/or fiber breaks; (3) learn the topology of the optical nodes 710.1-710.n on the optical ring network 702 (e.g., the co-resident controllers (C2) can exchange neighbor-to-neighbor connectivity information, allowing the co-resident controllers (C2) to build the topology of the supervisor channel 734, or a partial segment thereof, and, by inference, the topology of the optical nodes 710.1-710.n on the optical ring network 702); (4) determine the placement of what is referred to herein as a "logical break" (e.g., the co-resident controllers (C2) can determine the placement of the logical break, and move the logical break, if necessary—such a logical break, as further described below, is typically adjacent to the last known physical break in the fiber of the optical ring network 702); (5) propagate real-time optical ring network connect and/or disconnect notifications; (6) learn MAC address/IP address entries (e.g., the co-resident controllers (C2) can learn all of the MAC addresses/IP addresses that represent host computers (the "hosts"; for example, servers and/or any other suitable network equipment) attached to the access links of the optical nodes 710.1-710.n, and announce the MAC addresses/IP addresses to the other co-resident controllers (C2) so that they can determine how each MAC address/IP address can be reached); (7) remove or update MAC address/IP address entries; and, (8) propagate shared configuration information.

It is noted that a logical break may be established on a supervisor channel, and/or a flooding break may be established on one or more outer rings of an optical ring network, to prevent the creation of a so-called "bridge loop" in the layer-2 broadcast domain. For example, an optical node can place such a logical break on the supervisor channel 734 (see FIG. 7), and/or can place such a flooding break on one or more outer rings of the optical ring network 702 (see FIG. 7). Such outer rings generally correspond to a plurality of eastbound uplink ports (e.g., four (4) eastbound uplink ports, or any other suitable number of ports) and a plurality of westbound uplink ports (e.g., four (4) westbound uplink ports, or any other suitable number of ports) of an optical node. It is noted that a logical break can be placed on an optical ring network when it is fully connected, and can be co-located with the last known physical break in the fiber of the optical ring network.

For example, an optical node may place a logical break on the supervisor channel, and/or a flooding break on one or more of the outer rings of an optical ring network, by filtering network traffic in both directions on the eastbound uplink ports of the optical node. Specifically, when the optical node places the logical break on the supervisor channel, the optical node can filter the network traffic on its eastbound uplink ports to prohibit the propagation of all unicast, broadcast, and multicast data packets or frames except for a specified multicast data packet/frame (referred to herein as the "beacon frame"), which can be permitted to traverse the logical break to enable the network to determine whether or not the supervisor channel is faulty. Moreover, when the optical node places the flooding break on the outer rings, the optical node can filter the network traffic on its eastbound uplink ports to prohibit the flooding of all multi-destination data packets or frames, while permitting unicast data packets/frames having known destinations to traverse the flooding break. Such multi-destination data packets or frames are defined herein as broadcast data packets/frames, multicast data packets/frames, and unicast data packets/frames having unknown destinations. As a result, following the placement of such a flooding break, an optical node can still transmit unicast data packets/frames having known destinations in either direction around an optical ring network, and have the unicast data packets/frames successfully reach their respective destinations.

The data center network 700 (see FIG. 7) further includes the optical junction node 712 for interconnecting the network 700 with the rest of the network 714. The optical junction node 712 can have an associated co-resident controller (also referred to herein as "J-C2"). The optical junction node 712 is communicably coupleable to at least one of the optical nodes 710.1-710.n on the optical ring network 702, such as the optical node 710.n. The optical junction node 712 is also communicably coupleable to one or more other nodes in the rest of the network 714. As shown in FIG. 7, the co-resident controller J-C2 is communicably coupled to the central controller (C3) 708 via a controller interface 730, and further communicably coupled to the co-resident controller (C2) associated with the optical node 710.n via a controller interface 731. In the data center network 700, the central controller (C3) 708 can provide instructions to the co-resident controllers (C2) associated with the respective optical nodes 710.1-710.n, as well as the co-resident controller (J-C2) associated with the optical junction node 712, based at least on one or more requirements and/or constraints pertaining to the affinity-network topology, and/or one or more applications to be run on at least the optical ring network 702. Further, each co-resident controller (C2, J-C2) can support the central controller (C3) 708 by providing processing capabilities for one or more functions that can be performed in a de-centralized manner. The respective co-resident controllers (C2, J-C2) can operate independently of one another, and/or in concert, to maintain the operation of at least the optical ring network 702.

It is noted that a data center network architecture, such as one that includes the data center network 700, may include zero, one, or more optical junction nodes, such as the optical junction node 712. The optical nodes 710.1-710.n deployed on the optical ring network 702 can be connected to neighboring nodes through uplink ports, while the remaining ports on the optical nodes 710.1-710.n can be used as access links for interconnection to ports on other optical nodes, servers, and/or any other suitable network equipment.

The network topology 300 (see FIG. 3), the affinity topology 400 (see FIG. 4), and the affinity-network topology 500 (see FIG. 5), can each be expressed in the form of one or more data structures. FIG. 8a depicts an exemplary data structure 802 for the network topology 300. As shown in FIG. 8a, the data structure 802 includes information pertaining to exemplary network elements (e.g., a Network Element 1, a Network Element 2) and exemplary network links (e.g., a Network Link, NL) of the network topology 300 (see FIG. 3). Specifically, the information pertaining to the Network Element 1 includes, but is not limited to, the type of network element (e.g., a switch, a router, a server, etc.), and a list of network links outgoing from the Network Element 1. Similarly, the information pertaining to the Network Element 2 includes, but is not limited to, the type of network element (e.g., a switch, a router, a server, etc.), and a list of network links outgoing from the Network Element 2. Further, the information pertaining to the Network Link (NL) includes, but is not limited to, the endpoint network elements of the network link, and a description of the endpoint interfaces (e.g., MAC addresses, interface speeds, etc.).

FIG. 8b depicts an exemplary data structure 804 for the affinity topology 400. As shown in FIG. 8b, the data structure 804 includes information pertaining to exemplary affinity groups (e.g., an Affinity Group 1, an Affinity Group 2) and exemplary affinity links (e.g., an Affinity Link) within the affinity topology 400 (see FIG. 4). Specifically, the information pertaining to the Affinity Group 1 includes, but is not limited to, a list of affinity groups/ports contained within the Affinity Group 1, and a list of affinity links outgoing from the Affinity Group 1. Similarly, the information pertaining to the Affinity Group 2 includes, but is not limited to, a list of affinity groups/ports contained within the Affinity Group 2, and a list of affinity links outgoing from the Affinity Group 2. Further, the information pertaining to the Affinity Link includes, but is not limited to, a list of user-defined affinity requirements, and a list of computed affinity attributes.

FIG. 8c depicts an exemplary data structure 806 for the affinity-network topology 500. As shown in FIG. 8c, the data structure 806 includes information pertaining to exemplary affinity-network nodes (e.g., an Affinity-Network Node 1, an Affinity-Network Node 2) and exemplary affinity-network links (e.g., an Affinity-Network Link) within the affinity-network topology 500 (see FIG. 5). Specifically, the information pertaining to the Affinity-Network Node 1 includes, but is not limited to, the type of affinity-network node (e.g., a network node, an affinity group), and a list of affinity-network links outgoing from the Affinity-Network Node 1 (e.g., an affinity link, a network link, an association link linking an affinity element to the network element it traverses). Similarly, the information pertaining to the Affinity-Network Node 2 includes, but is not limited to, the type of affinity-network node (e.g., a network node, an affinity group), and a list of affinity-network links outgoing from the Affinity-Network Node 2 (e.g., an affinity link, a network link, an association link linking an affinity element to the network element it traverses). Further, the information pertaining to the Affinity-Network Link includes, but is not limited to, the type of affinity-network link (e.g., an affinity link, a network link, an association link linking an affinity element to the network element it traverses).

As described above, within an exemplary affinity descriptor modeling framework, one or more affinity requirements can be established for each of the affinity links 412, 414, 416, 418, 420, 422 within the affinity topology 400 (see FIG. 4). In such an affinity descriptor modeling framework, application affinity descriptors can be defined with respect to at least the following three perspectives: (1) a user-defined description of desired application intra-working requirements (generally qualitative); (2) an analyzed view of the actual application intra-working requirements (generally quantitative); and (3) an analyzed view of application affinities, given removal of layer-2/layer-3 constraints and/or slight perturbations of the physical and/or affinity topology constraints (generally both quantitative and qualitative).

As employed herein, the affinity descriptor modeling framework can focus on various types of affinity requirements, including, but not limited to, communication-related affinity requirements, reliability-related affinity requirements, and security-related affinity requirements. Such affinity requirements generally fall into two categories, which relate to keeping certain network/affinity elements (e.g., VMs) together, and keeping certain network/affinity elements (e.g., VMs) apart. The affinity descriptor modeling framework described herein seeks to capture aspects relating to the network topology (e.g., the network topology 300; see FIG. 3), while reducing the number of rules to be specified for corresponding pairs of affinity elements/groups within the affinity topology (e.g., the affinity topology 400; see FIG. 4).

As further described above, an affinity group is defined herein as a collection of servers or virtual machines (VMs), a cluster (e.g., a set of servers that are load balanced and provide high availability), and/or data center resident applications that require high interconnectivity bandwidth, low latency, and/or multicast or broadcast services. Such an affinity group can correspond to an arbitrary set of other affinity groups. The base case is a singleton affinity group, or an affinity element (e.g., a VM, a virtual appliance, etc.) that cannot be broken down further into other affinity elements/groups. Each of the affinity requirements employed herein, such as the communication-related affinity requirements, the reliability-related affinity requirements, and the security-related affinity requirements, can be expressed with respect to pairs of affinity elements/groups within the affinity topology (e.g., the affinity topology 400; see FIG. 4). Further, each affinity link coupling affinity elements/groups within the affinity topology generally implies the existence of so-called "affinity" between those affinity elements/groups. It is noted that the affinity attributes of an affinity link coupling a pair of affinity elements/groups generally provide a description of the implied affinity between that pair of affinity elements/groups.

It is further noted that groupings of affinity elements/groups within the affinity topology (e.g., the affinity topology 400; see FIG. 4) can yield containment graphs that are essentially devoid of hierarchical levels. This results from allowing substantially arbitrary groupings of affinity elements/groups within the affinity topology. However, using the attributes of the affinity links, hierarchy and other such classification methodologies can be incorporated, as required and/or desired, in the descriptions of the implied affinity between pairs of affinity elements/groups within the affinity topology.

Table I below is an affinity group relational table that illustrates exemplary "inter" and "intra" attributes of affinity links that can couple pairs of affinity elements/groups, in which "$AG_1$", "$AG_2$", "$AG_3$", and "$AG_4$" each correspond to an exemplary affinity group (AG) within an exemplary affinity topology.

TABLE I

|  | $AG_1$ | $AG_2$ | $AG_3$ | $AG_4$ |
|---|---|---|---|---|
| $AG_1$ | X |  |  | O |
| $AG_2$ | O | X |  |  |
| $AG_3$ |  |  | X |  |
| $AG_4$ | O |  |  | X |

With reference to Table I above, cells at table locations ($AG_k$, $AG_m$), in which "k" is not equal to "m", illustrate communication, reliability, and security-related affinity requirements between an ordered pair of affinity groups $AG_k$, $AG_m$. Further, cells at table locations ($AG_k$, $AG_k$) along the main diagonal of Table I illustrate communication, reliability, and security-related affinity requirements within sub-component affinity elements/groups that make up the $AG_k$.

With regard to the inter-AG cells ($AG_k$, $AG_m$) in Table I above that contain the symbol entry, "O", the affinity requirements generally apply between all sub-components of $AG_k$, and all sub-components of $AG_m$. An entry in a cell at a table location ($AG_k$, $AG_m$) implies the presence of an affinity link between the affinity groups $AG_k$ and $AG_m$. Table I above therefore provides a representation of the exemplary affinity topology in table form. Further, an empty cell in Table I above implies no such affinity requirements between the affinity groups $AG_k$, $AG_m$. With regard to the intra-AG cells ($AG_k$, $AG_k$) in Table I above that contain the symbol entry, "X", the affinity requirements can generally refer to another such relational table for all sub-components (of lower level) of $AG_k$, as further described below.

For example, there can be three generic intra-AG table types, namely, (1) clustered, implying all-to-all communication of the same form and magnitude, (2) disassociated, implying no communication-related affinity requirements within any two sub-components of the AG, and (3) custom, implying that the user specifies the intra-AG relational table. It is noted that the above intra-AG table types provide templates for intra-AG affinity group relational tables that can apply to any communication, security, or reliability-related affinity requirements. In general, a clustered relational table denotes all-to-all affinity requirements of the same form, a disassociated relational table denotes no intra-AG requirements, and a custom relational table denotes a user specified table.

More specifically, the communication-related affinity requirements can relate to the following aspects: (1) the bandwidth from $AG_k$ to $AG_m$ {e.g., characterized as low, medium, high}; (2) the hops from $AG_k$ to $AG_m$ {e.g., characterized as insensitive, sensitive, bounded}; (3) the latency from $AG_k$ to $AG_m$ {e.g., characterized as insensitive, sensitive, bounded}; (4) the multicast dispersion from $AG_k$ to $AG_m$ {e.g., characterized as insensitive, sensitive, bounded}; (5) the oversubscription along $AG_k$ to $AG_m$ communication paths {e.g., characterized as insensitive, sensitive, bounded}; and (6) the underlying network state for $AG_k$ {e.g., characterized as insensitive, sensitive, bounded}.

Further, the reliability-related affinity requirements can relate to the following aspects: (1) the number of physical machine failures before $AG_k$ to $AG_m$ communication path disconnection {e.g., characterized as insensitive, sensitive, bounded}; (2) the number of layer-2 switch failures before $AG_k$ to $AG_m$ communication path disconnection {e.g., characterized as insensitive, sensitive, bounded}; (3) the number of layer-3 router failures before $AG_k$ to $AG_m$ communication path disconnection {e.g., characterized as insensitive, sensitive, bounded}; (4) the number of link failures before $AG_k$ to $AG_m$ communication path disconnection {e.g., characterized as insensitive, sensitive, bounded}; and (5) the total number of single points of failure (SPoF) before $AG_k$ to $AG_m$ communication path disconnection {e.g., characterized as insensitive, sensitive, bounded}.

Moreover, the security-related affinity requirements can relate to the following aspects: (1) the number of shared physical machines between $AG_k$ and $AG_m$ {e.g., characterized as insensitive, sensitive, bounded}; (2) the number of shared switches between $AG_k$ and $AG_m$ {e.g., characterized as insensitive, sensitive, bounded}; (3) the number of shared links between $AG_k$ and $AG_m$ {e.g., characterized as insensitive, sensitive, bounded}; (4) the isolation of $AG_k$ {e.g., characterized as insensitive, sensitive}; and (5) the communication path intersection of $AG_k$ with $AG_m$ {e.g., characterized as insensitive, sensitive, bounded}.

Figure 9:
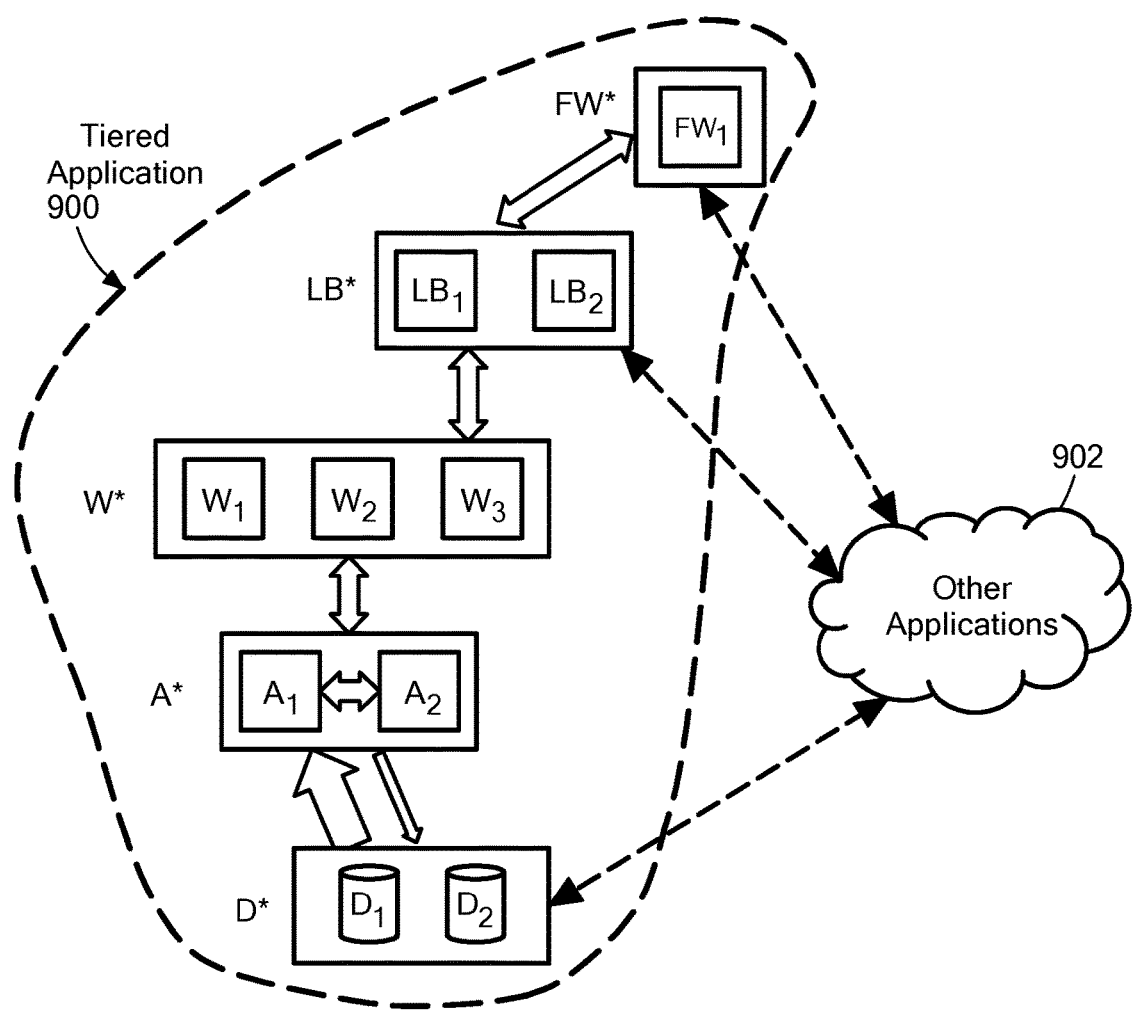
FIG. 9 is a block diagram of an exemplary tiered application program implemented using a plurality of affinity groups.

The use of affinity group relational tables, such as Table I above, is further described below with reference to the following illustrative example, as well as FIG. 9. FIG. 9 depicts an exemplary tiered application 900 that includes an affinity group FW* containing a firewall $FW_1$, an affinity group LB* containing a pair of load balancers $LB_1$, $LB_2$, an affinity group W* containing three web servers $W_1$, $W_2$, $W_3$, an affinity group A* containing a pair of application servers $A_1$, $A_2$, and an affinity group D* containing a pair of data servers $D_1$, $D_2$. As shown in FIG. 9, the tiered application 900 can communicate with one or more other applications 902.

Table II below is an exemplary affinity group relational table that illustrates the "inter" and "intra" attributes of affinity links that couple pairs of the affinity groups W*, A*, D*, LB*, FW* within the tiered application 900 (see FIG. 9).

TABLE II

|     | W* | A* | D* | LB* | FW* |
| --- | --- | --- | --- | --- | --- |
| W*  | X  | M  |    | M   |     |
| A*  | M  | X  | L  |     |     |
| D*  |    | H  |    |     |     |
| LB* | M  |    |    |     |     |
| FW* |    |    |    | M   |     |

With reference to Table II above, the inter-AG cells at table locations (W*, A*), (W*, LB*), (A*, W*), (A*, D*), (LB*, W*), and (FW*, LB*) illustrate communication, reliability, and/or security-related affinity requirements (e.g., "L"=low, "M"=medium, "H"=high) between the corresponding pairs of affinity groups within the tiered application 900 (see FIG. 9). Further, the intra-AG cells at table locations (W*, W*) and (A*, A*), containing the symbol entry, "X", along the main diagonal of Table II, illustrate communication, reliability, and/or security-related affinity requirements within the component affinity elements that make up the corresponding affinity groups W*, A*.

Table III below is an exemplary relational table for the intra-AG cell at the table location (W*, W*) in Table II above.

TABLE III

|       | $W_1$ | $W_2$ | $W_3$ |
| ---   | ---   | ---   | ---   |
| $W_1$ |       |       |       |
| $W_2$ |       |       |       |
| $W_3$ |       |       |       |

With reference to Table III above, the relational table for the intra-AG cell at the table location (W*, W*) in Table II above is of the disassociated type, implying no communication-related affinity requirements for the affinity elements $W_1$, $W_2$, $W_3$ within the affinity group W*. The cells at all table locations in Table III above are therefore empty.

Table IV below is an exemplary relational table for the intra-AG cell at the table location (A*, A*) in Table II above.

TABLE IV

|       | $A_1$ | $A_2$ |
| ---   | ---   | ---   |
| $A_1$ |       | H     |
| $A_2$ | H     |       |

With reference to Table IV above, the type of the relational table for the intra-AG cell at the table location (A*, A*) in Table II is clustered, implying all-to-all communication of the same magnitude (e.g., H=high) for the affinity elements $A_1$, $A_2$ within the affinity group A*.

It is noted that multiple affinity groups can have affinity requirements with respect to the same affinity group, $AG_k$ (referred to herein as affinity group reuse/application affinity descriptor reuse). In this case, the user typically does not have to re-specify the affinity group $AG_k$. The affinity group $AG_k$ can therefore be made to exist in multiple relational tables, simultaneously. Further, multiple affinity groups can have affinity requirements with respect to different parts of the same affinity group $AG_k$. In this case, different versions of the affinity group $AG_k$ can be specified by the user for each relational table (this generally applies if the affinity group $AG_k$ can be implemented as a generic "black box").

In addition, an affinity group may be formed as an amalgam of a set of non-mutually exclusive affinity groups. For example, affinity groups can have pre-defined intra-group affinity descriptions that may conflict with one another, particularly, if one or more of the affinity groups $AG_k$ are implemented as generic black boxes. Accordingly, it may be necessary to define a set of rules for building a disambiguated affinity element-to-affinity element relational table. The process of defining a set of rules for building such a disambiguated relational table is referred to herein as "affinity group disambiguation".

The use of such a disambiguated affinity element-to-affinity element relational table, such as the exemplary disambiguated affinity element-to-affinity element relational table, Table V, is described below with reference to the following illustrative example, as well as FIG. 10.

TABLE V

|       | $A_1$ | $A_2$ | $A_3$ | $A_4$ |
| ---   | ---   | ---   | ---   | ---   |
| $A_1$ |       | L     | H     | H     |
| $A_2$ | L     |       | L     | L     |
| $A_3$ | H     | L     |       | H     |
| $A_4$ | H     | L     | H     |       |

Figure 10:
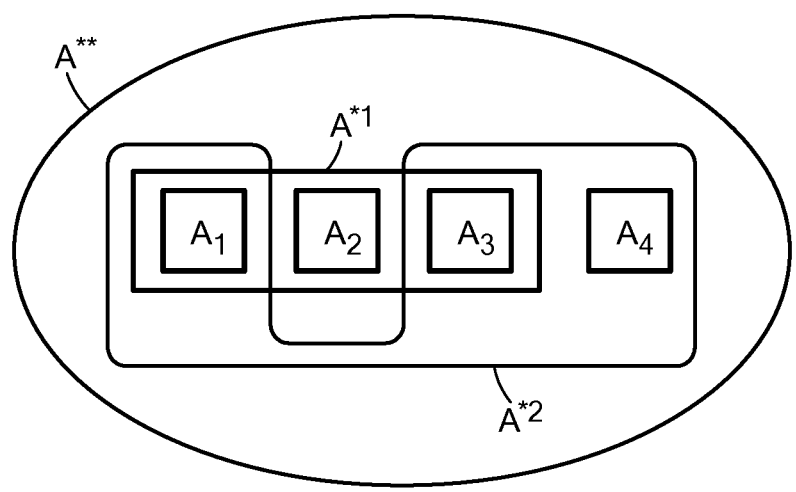
FIG. 10 is a diagram of an exemplary affinity group that contains two other affinity groups.

In this example, an affinity group A** contains two affinity groups $A^{*1}$, $A^{*2}$ (see FIG. 10). As shown in FIG. 10, the affinity group $A^{*1}$ contains affinity elements $A_1$, $A_2$, $A_3$, and the affinity group $A^{*2}$ contains affinity elements $A_1$, $A_3$, $A_4$.

Table VI below is an exemplary affinity group relational table that illustrates the "inter" and "intra" attributes of affinity links that couple pairs of the affinity groups $A^{*1}$, $A^{*2}$ within the affinity group A** (see FIG. 10).

TABLE VI

|          | $A^{*1}$ | $A^{*2}$ |
| ---      | ---      | ---      |
| $A^{*1}$ | X        | L        |
| $A^{*2}$ | L        | X        |

With reference to Table VI above, the inter-AG cells at table locations ($A^{*2}$, $A^{*1}$), ($A^{*1}$, $A^{*2}$) illustrate communication, reliability, and/or security-related affinity requirements (e.g., "L"=low) between the corresponding pairs of the affinity groups $A^{*1}$, $A^{*2}$. Further, the intra-AG cells at table locations ($A^{*1}$, $A^{*1}$) and ($A^{*2}$, $A^{*2}$), containing the symbol entry, "X", along the main diagonal of Table VI, illustrate communication, reliability, and/or security-related affinity requirements within the affinity elements that make up the corresponding affinity groups $A^{*1}$, $A^{*2}$.

Table VII below is an exemplary relational table for the intra-AG cell at the table location ($A^{*1}$, $A^{*1}$) in Table VI above.

TABLE VII

|  | $A_1$ | $A_2$ | $A_3$ |
|---|---|---|---|
| $A_1$ |  | M |  |
| $A_2$ |  |  |  |
| $A_3$ |  |  |  |

With reference to Table VII above, the communication, reliability, and/or security-related affinity requirements between the pair of the affinity elements $A_1$, $A_3$ within the affinity group $A^{*1}$ is designated as "M=medium".

Table VIII below is an exemplary relational table for the intra-AG cell at the table location ($A^{*2}$, $A^{*2}$) in Table VI above.

TABLE VIII

|  | $A_1$ | $A_3$ | $A_4$ |
|---|---|---|---|
| $A_1$ |  | H |  |
| $A_3$ |  |  |  |
| $A_4$ |  |  |  |

With reference to Table VIII above, the communication, reliability, and/or security-related affinity requirements between the pair of affinity elements $A_1$, $A_3$ within the affinity group $A^{*2}$ is designated as "H=high". Accordingly, as indicated in Tables VII and VIII above, there is ambiguity between the two affinity groups $A^{*1}$, $A^{*2}$ within the affinity group $A^{**}$ (see FIG. 10).

To avoid such ambiguity between the affinity groups $A^{*1}$, $A^{*2}$ (see FIG. 10), a disambiguated affinity element-to-affinity element relational table, such as the exemplary Table V above, can be constructed for the affinity group $A^{**}$ (see FIG. 10). For example, as indicated in Table V above, the communication, reliability, and/or security-related affinity requirements between the pair of affinity elements $A_1$, $A_3$ is designated as "H=high". Such affinity requirements for the affinity elements $A_1$, $A_3$ can apply for both of the affinity groups $A^{*1}$, $A^{*2}$ within the affinity group $A^{**}$. The affinity group disambiguation illustrated above can be based on a disambiguating rule that gives precedence to more granular application affinity descriptors, followed by more strict application affinity descriptors.

As employed herein, the term "affinity ports" is used to describe the interfaces of an affinity group that are external to other affinity groups. For example, such affinity ports can be a subset of the ports of affinity elements/groups within an overall affinity group. Moreover, affinity groups can include affinity ports that represent interfaces to other affinity groups, and at least some of the affinity requirements can represent communications requirements between the affinity ports of the respective affinity groups.

Figure 11:
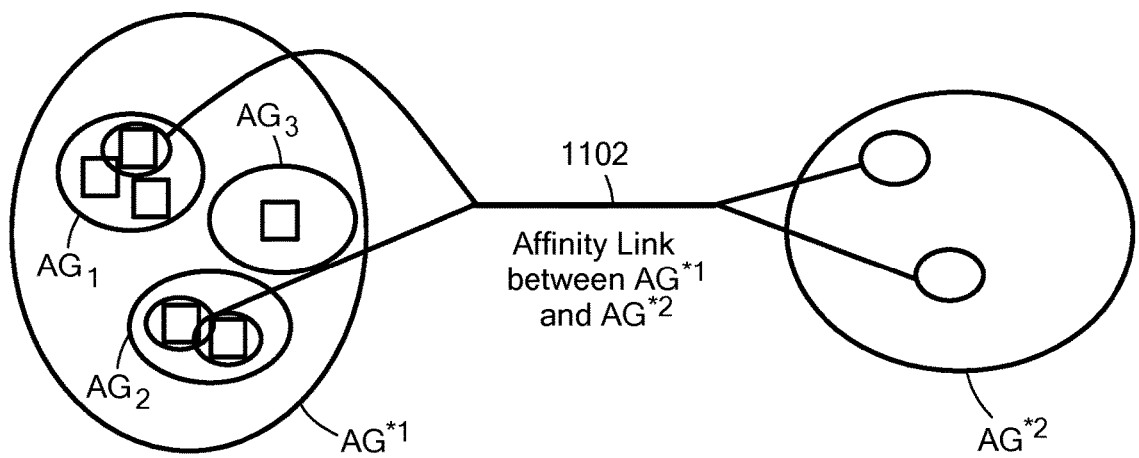
FIG. 11 is a diagram of exemplary affinity ports for a plurality of affinity groups.

FIG. 11 depicts exemplary affinity ports of affinity groups $AG_1$, $AG_2$, which are contained within an overall affinity group $AG^{*1}$. As shown in FIG. 11, the affinity group $AG^{*1}$ is coupled to an affinity group $AG^{*2}$ by an affinity link 1102. With further reference to FIG. 11, the notation "$P(AG_k)$" is used to represent the affinity ports of affinity group $AG_k$. An inter-AG affinity descriptor between the affinity groups $AG_1$, $AG_2$ can be used to describe the relationship between the affinity ports of the affinity groups $AG_1$, $AG_2$. Further, a set of rules for the affinity ports of the affinity groups $AG_1$, $AG_2$ can be defined, such as (1) unless explicitly defined, by default, the affinity ports of an $AG_k$ are the disambiguated affinity ports of the affinity elements/affinity groups within the $AG_k$, (2) the affinity port of an affinity element is the affinity element itself, and/or any other suitable rule.

As described above, using at least the affinity-network topology, the affinity-network topology score calculator 210 (see FIG. 2) can determine an affinity group score for each affinity group, an affinity link score for each affinity link, and a network-wide affinity score for the overall network. Such affinity scoring can be performed (1) per affinity link score, based on actual/analyzed affinity attributes relative to user-defined affinity attribute requirements, and/or pre-defined default affinity attribute requirements, (2) per affinity group score, based on a combination of intra and inter affinity link scores, and (3) per network-wide affinity score, based on an aggregate affinity score over all of the affinity groups in the network.

For example, if the information pertaining to an affinity link coupling an exemplary pair of affinity groups includes the following list of user-defined affinity requirements: (a) Bandwidth=medium; (b) Hops=sensitive; (c) Total single points of failure (SPoF)=bounded≤0; and (d) Shared links=sensitive, and further includes the following list of actual, computed affinity attributes: (a) Bandwidth=1×10 Gbps; (b) Hops=6; (c) Total SPoF=1; and (d) Shared links=2, then such affinity scoring can be expressed as follows: (a) the bandwidth score is 1; (b) the hops score is 0.5 (e.g., the affinity ports may be physically separated by just 2 hops); (c) the total single points of failure (SPoF) score is 0; and (d) the shared links score is 0.5. As a result, the total affinity score for this example can be calculated as follows:

Total Affinity Link Score=1+0.5+0+0.5=2, out of a possible total score of 4.

As described above, in an exemplary affinity descriptor modeling framework, application affinity descriptors can be defined with respect to user-defined descriptions of desired application intra-working requirements (generally qualitative), an analyzed view of the actual application intra-working requirements (generally quantitative), and an analyzed view of application affinities, given removal of layer-2/layer-3 constraints and/or slight perturbations of the physical and/or affinity topology constraints (generally both quantitative and qualitative).

With regard to such quantitative analysis, it can be assumed that an affinity link between affinity groups $AG_k$ and $AG_m$ generally implies an all-to-all affinity ports-to-affinity ports relationship requirement from affinity elements in $P(AG_k)$ to affinity elements in $P(AG_m)$ (e.g., "$P(AG_k)$" represents the affinity ports of $AG_k$, and "$P(AG_m)$" represents the affinity ports of $AG_m$). By default, the affinity ports of an affinity group are equal to the affinity ports of its sub-component affinity elements/affinity groups. It is further assumed that such affinity groups are disambiguated before the application affinity descriptors are determined.

Moreover, for each affinity link, the affinity-network topology viewer 212 (see FIG. 2) can determine (1) a headline value, which is typically a worst case bound on a relationship between two affinity port members in P(AG$_k$) and P(AG$_m$), and (2) a set of descriptive values, e.g., histograms, averages, network overlays, etc., that can further illustrate the affinity relationship. For example, such application affinity descriptors can be evaluated based on static network snapshots.

It is noted that certain assumptions can also be made with regard to affinity links, such as an affinity link coupling the affinity groups AG$_k$, AG$_m$. Such affinity links can be assumed to be ordered, e.g., the affinity link coupling the affinity groups AG$_k$, AG$_m$ can be different from an affinity link coupling affinity groups AG$_m$, AG$_k$. It is also assumed that the affinity groups AG$_k$, AG$_m$ can both contain one or more affinity elements (e.g., one or more VMs), and that the affinity groups AG$_k$, AG$_m$ can have one or more common elements, implying an aggregate of all-to-all relationships between affinity ports (i,j), $\forall i \in P(AG_k), j \in P(AG_m)$.

With reference to the quantitative analysis assumptions described above, the hop count, the latency, the multicast dispersion, the bandwidth, and the oversubscription between the exemplary affinity groups AG$_k$, AG$_m$ will be discussed below, as well as the underlying network state for the affinity group AG$_k$, the total number of failures before disconnection between the affinity groups AG$_k$, AG$_m$, the total number of single points of failure (SPoF) between the affinity groups AG$_k$, AG$_m$, the total number of shared links and/or switches between the affinity groups AG$_k$, AG$_m$, the isolation of the affinity group AG$_k$, and the communication path intersection of the affinity groups AG$_k$, AG$_m$.

Figure 12:
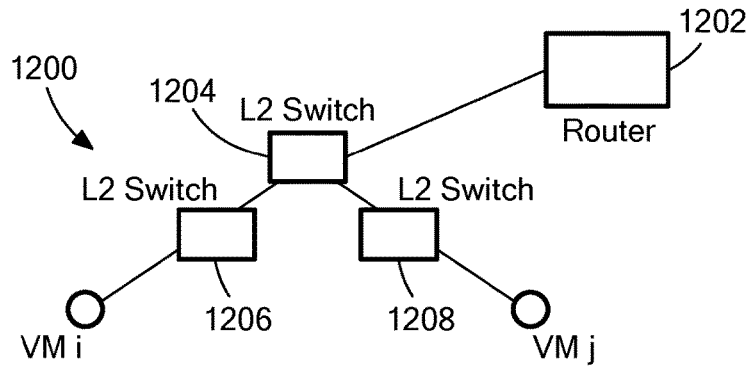
FIG. 12 is a block diagram of an exemplary network used to determine the hop count between a plurality of affinity groups.

FIG. 12 depicts an exemplary network 1200 that includes a router 1202, a plurality of layer-2 switches 1204, 1206, 1208, and a plurality of virtual machines, namely, VM$_i$ and VM$_j$. With reference to FIG. 12, it is assumed that the virtual machines VM$_i$ and VM$_j$ can be included in the same VLAN. Accordingly, the hop count can be equal to three (3) hops.

If the virtual machines VM$_i$ and VM$_j$ (see FIG. 12) were included in different VLANs, in which each VLAN is like the VLAN depicted in FIG. 12, then the hop count between such virtual machines VM$_i$ and VM$_j$ included in different VLANs can be equal to five (5) hops. In general, the hop count is equal to the number of layer-2 switch hops, subject to layer-2/layer-3 constraints. For example, the layer-2 constraints can correspond to spanning tree edges, and/or any other suitable layer-2 constraint, and the layer-3 constraints can correspond to the VLANs/router locations (assuming the closest router is used), and/or any other suitable layer-3 constraint. Moreover, what is referred to herein as an "unconstrained hop count" between the affinity groups AG$_k$ and AG$_m$ can be determined, taking into account the physical connectivity between the affinity groups AG$_k$, AG$_m$, but ignoring the layer-2/layer-3 constraints. For example, the unconstrained hop count is three (3) hops for the exemplary network 1200 (see FIG. 12).

It is noted that the headline value, which is the worst case bound on a relationship between two affinity port members in P(AG$_k$) and P(AG$_m$), can correspond to the maximum or worst case hop count between any two affinity ports in the affinity groups AG$_k$ and AG$_m$, respectively, and/or any other suitable headline value. In addition, the set of descriptive values can include (1) a histogram of the hop counts between any two affinity ports in the affinity groups AG$_k$ and AG$_m$, respectively, (2) the average hop count over (a) all pairs of affinity ports in the affinity groups AG$_k$ and AG$_m$, and/or (b) the maximum or worst case hop count between any two affinity ports in the affinity groups AG$_k$ and AG$_m$, respectively, and/or any other suitable descriptive value.

Moreover, the hop count descriptor (e.g., the hop count requirement between affinity groups/elements) can be specified in a temporal or conditional manner. For example, the hop count requirement between the affinity groups AG$_k$, AG$_m$ may only exist for a specific amount of time during the day. Further, the hop count requirement between the affinity groups AG$_k$, AG$_m$ may only exist if other conditions are met (e.g., the presence of another affinity group, AG$_p$, or the presence of another affinity descriptor between the affinity groups AG$_k$, AG$_m$).

The latency between a pair of affinity elements/groups can be determined with reference to the hop count between that pair of affinity elements/affinity groups, multiplied by the forwarding latency. Further, if statistics such as link utilization, queue delay, etc., are available for network elements traversed by communication paths between the affinity groups AG$_k$ and AG$_m$, then a more accurate determination of latency can be made as a function of such statistics. The latency descriptor (e.g., the latency requirement between affinity groups/elements) can be specified in a temporal or conditional manner.

It is noted that, with regard to latency, the headline value can correspond to the maximum or worst case latency between any two affinity ports in the affinity groups AG$_k$ and AG$_m$, respectively, and/or any other suitable headline value. In addition, the set of descriptive values can include (1) a histogram of the latency between any two affinity ports in the affinity groups AG$_k$ and AG$_m$, respectively, (2) the average latency over (a) all pairs of affinity ports in the affinity groups AG$_k$ and AG$_m$, and/or (b) the maximum or worst case latency between any two affinity ports in the affinity groups AG$_k$ and AG$_m$, respectively, and/or any other suitable descriptive value.

In general, the latency between a pair of affinity groups/elements is equal to the latency accrued across all traversed networking devices (e.g., switches, routers), subject to layer-2/layer-3 constraints. Moreover, what is referred to herein as an "unconstrained latency" between the affinity groups AG$_k$ and AG$_m$ can be determined, taking into account the physical connectivity between the affinity groups AG$_k$, AG$_m$, but ignoring the layer-2/layer-3 constraints.

The multicast dispersion between a pair of affinity elements/groups can be determined with reference to the worst case hop count or latency, minus the best case hop count or latency between an affinity port in a first affinity group/element (i.e., multicast transmitter(s)) and all affinity ports in a second affinity group/element (i.e., multicast receiver(s)). The multicast dispersion descriptor (e.g., the multicast dispersion requirement between affinity groups/elements) can be specified in a temporal or conditional manner.

Figure 13:
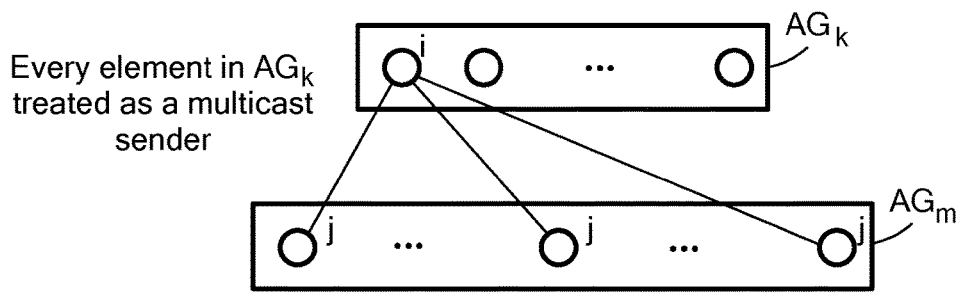
FIG. 13 is a diagram of a pair of exemplary affinity groups for use in determining the multicast dispersion between the respective affinity groups.

FIG. 13 depicts an exemplary view of the affinity groups AG$_k$, AG$_m$, in which each of the affinity groups AG$_k$, AG$_m$ includes a plurality of affinity elements, such as the affinity element "i" included in the affinity group AG$_k$ and the affinity elements "j" included in the affinity group AG$_m$. As shown in FIG. 13, each affinity element included in the affinity group AG$_k$, such as the affinity element, i, is considered to operate as a multicast sender. Accordingly, the affinity element, i, included in the affinity group AG$_k$ is illustrated as a multicast sender of information to each of the plurality of affinity elements, j, included in the affinity group AG$_m$.

With reference to FIG. 13, the evaluation of multicast dispersion is based on the affinity ports of each affinity group AG$_k$ multicasting to all of the affinity ports within the affinity group AG$_m$. Such multicast dispersion can be interpreted with reference to the time of the last reception of information, minus the time of the first reception of information, which, for example, can be measured in relation to hops or latency.

In general, the multicast dispersion (the "dispersion") from the affinity element, i (see FIG. 13), included in the affinity group $AG_k$, to the affinity elements, j, included in the affinity group $AG_m$, can be expressed as follows, $$\text{dispersion} = \max_{j \in AG_m} \{HC(i, j)\} - \min_{j \in AG_m} \{HC(i, j)\}, \quad (1)$$

in which "HC(i,j)" corresponds to the hop count between the affinity element, i, and each affinity element, j. Similarly, if latency is used, then equation (1) above can be modified as follows, $$\text{dispersion} = \max_{j \in AG_m} \{L(i, j)\} - \min_{j \in AG_m} \{L(i, j)\}, \quad (1.1)$$

in which "L(i,j)" corresponds to the latency between the affinity element, i, and each affinity element, j.

It is noted that a "constrained" variant of multicast dispersion can be determined, taking into account the layer-2/layer-3 constraints (e.g., VLANs, spanning tree, etc.). Further, an "unconstrained" variant of multicast dispersion can be determined, taking into account the physical connectivity, but ignoring the layer-2/layer-3 constraints.

Moreover, with regard to multicast dispersion, the headline value can correspond to the maximum multicast dispersion over all of the affinity elements included in the affinity group $AG_k$ (see FIG. 13), and/or any other suitable headline value. In addition, the set of descriptive values can include (1) a histogram of the multicast dispersion over all of the affinity elements included in the affinity group $AG_k$, (2) the average multicast dispersion over all of the affinity elements included in the affinity group $AG_k$, and/or any other suitable descriptive value.

FIG. 14a depicts an exemplary affinity-network topology 1400, in which nodes 1, 6, 9 correspond to sub-component affinity ports/elements of the exemplary affinity group $AG_k$, nodes 2, 4, 7, 10 correspond to sub-component affinity ports/elements of the exemplary affinity group $AG_m$, and nodes 3, 5, 8 correspond to network elements that are not contained within any affinity group. FIG. 14a further depicts an exemplary view 1401 of the affinity-network topology 1400 that focuses on communication between the respective nodes 1 through 10.

With reference to FIG. 14a, static evaluation of the bandwidth between the affinity groups $AG_k$, $AG_m$ can be viewed from three perspectives, as follows: (1) the minimum/maximum "flow" that any single affinity element, i, in $P(AG_k)$ can provide to $P(AG_m)$; (2) the maximum aggregate "flow" from $P(AG_k)$ to $P(AG_m)$; and (3) the bandwidth versus hops descriptor.

Such a bandwidth descriptor can be expressed as, for example, "Minimum/maximum flow from affinity element 1=1 unit", and "Maximum aggregate flow=5 units", in which a bandwidth "unit" refers to a basic unit of bandwidth, e.g., 1 Gbps. FIG. 14b depicts an exemplary bandwidth descriptor for affinity element 6 of the affinity-network topology 1400 (see FIG. 14a). The bandwidth descriptor (e.g., the bandwidth requirement between affinity groups/elements) can be specified in a temporal or conditional manner.

It is noted that a "constrained" variant of bandwidth can be determined, taking into account the layer-2/layer-3 constraints (e.g., VLANs, spanning tree, etc.). Further, an "unconstrained" variant of bandwidth can be determined, taking into account the physical connectivity, but ignoring the layer-2/layer-3 constraints.

Moreover, with regard to bandwidth, the headline value can correspond to (1) the minimum/maximum flow from any affinity element i within the affinity group $AG_k$ to any affinity element i within the affinity group $AG_m$, (2) the maximum aggregate flow from the affinity group $AG_k$ to the affinity group $AG_m$ (e.g., computed using maximum-flow/minimum-cut techniques), (3) the minimum/maximum flow and/or the maximum aggregate flow subject to hop count bounds, and/or any other suitable headline value. In addition, the set of descriptive values can include (1) the bandwidth versus hops descriptor, (2) a histogram of bandwidth from any affinity element within the affinity group $AG_k$ to any affinity element within the affinity group $AG_m$, (3) the average of communication path lengths from a particular affinity element within the affinity group $AG_k$ to any affinity element within the affinity group $AG_m$, and/or any other suitable descriptive value.

As employed herein, the term "oversubscription" between the exemplary affinity groups $AG_k$, $AG_m$ refers to the worst case bottleneck affinity/network element (e.g., a link, a switch, a router) that lies along communication paths between all ports i that are a member of $P(AG_k)$, and all ports j that are a member of $P(AG_m)$, taking into account all application affinity descriptors that include communication paths with affinity/network elements that intersect the $AG_k$ to $AG_m$ affinity descriptor. For example, with reference to FIG. 14a, the network link from node 7 to node 10 of the affinity-network topology 1400 can be considered to be oversubscribed. Specifically, the network link from node 7 to node 10 is subscribed three times by the $AG_k$ to $AG_m$ affinity descriptor (e.g., 1→10, 6→10, 9→10).

It is noted that a "constrained" variant of oversubscription can be determined, taking into account the layer-2/layer-3 constraints (e.g., VLANs, spanning tree, etc.). Further, an "unconstrained" variant of oversubscription can be determined, taking into account the physical connectivity, but ignoring the layer-2/layer-3 constraints. Moreover, with regard to oversubscription, the headline value can correspond to the total size of all of the flows/communication paths going through the most oversubscribed link between $P(AG_k)$ and $P(AG_m)$, and/or any other suitable headline value. In addition, the set of descriptive values can include (1) a histogram of the size of the flows on each link between the affinity groups $AG_k$, $AG_m$, (2) a visual display of the most oversubscribed links, and/or any other suitable descriptive value. The oversubscription descriptor can be specified in a temporal or conditional manner.

As employed herein, the underlying network state for the exemplary affinity group $AG_k$ constitutes a temporal measurement of the network state (e.g., link utilization, queue depths, etc.) of the network elements (e.g., switches, links) that intra-$AG_k$ links and outgoing inter-$AG_k$ links traverse. For example, one way of handling the underlying network state for the affinity group $AG_k$ is to focus on abrupt changes in the network state due to major events, such as vMotions ("vMotion" is a feature of virtualization software sold by VMware, Inc., Palo Alto, Calif., USA; the vMotion feature can be used to relocate a virtual machine (VM) from one server to another server), backups, error tickets, etc.

It is noted that a "constrained" variant of the underlying network state for an affinity group can be determined, taking into account the layer-2/layer-3 constraints (e.g., VLANs, spanning tree, etc.). Further, an "unconstrained" variant of the underlying network state for an affinity group can be determined, taking into account the physical connectivity, but ignoring the layer-2/layer-3 constraints. Moreover, with regard to the underlying network state for the affinity group $AG_k$, the headline value can be, e.g., stable or perturbed (e.g., over some predetermined time window). In addition, the set of descriptive values can include (1) a list of major change events that occurred within the predetermined time window during which the perturbation occurred, (2) a correlation with specific events that involve affinity elements within the affinity group $AG_k$, network links that the intra/outgoing links of the affinity group $AG_k$ traversed, etc., (3) details of which network and affinity attribute metrics changed, and/or any other suitable descriptive value. The underlying network state descriptor can be specified in a temporal or conditional manner.

As employed herein, the term "total number of failures before affinity group $AG_k$, $AG_m$ disconnection" refers to the total number of link and/or switch failures before the affinity ports $P(AG_k)$ become disconnected from the affinity ports $P(AG_m)$.

FIG. 15 depicts an exemplary affinity-network topology 1500, in which node 1 corresponds to a sub-component affinity element of the exemplary affinity group $AG_k$, node 5 corresponds to a sub-component affinity element of the exemplary affinity group $AG_m$, and nodes 2, 3, 4 correspond to affinity elements that are not contained within any affinity group. With reference to FIG. 15, if either the network link coupling the nodes 1, 2 becomes disconnected, or the node 2 (e.g., a switch) fails, then the node 1 and the node 5 can become disconnected. The nodes 1, 5 can therefore become disconnected with a single link or switch failure. For example, if the network link coupling the nodes 1, 2 were part of a link-aggregation group, then there may be either two link failures, or one switch failure, before the nodes 1, 5 can become disconnected.

It is noted that a "constrained" variant of the total number of failures before affinity group disconnection can be determined, taking into account the layer-2/layer-3 constraints (e.g., VLANs, spanning tree, etc.). Further, an "unconstrained" variant of the total number of failures before affinity group disconnection can be determined, taking into account the physical connectivity, but ignoring the layer-2/layer-3 constraints. Moreover, with regard to the total number of failures before affinity group $AG_k$, $AG_m$ disconnection, the headline value can be the number of link failures or switch failures before disconnection, and/or any other suitable headline value. In addition, the set of descriptive values can include (1) a list of bottleneck links, (2) a list of bottleneck switches, and/or any other suitable descriptive value. The total number of failures descriptor can be specified in a temporal or conditional manner.

As employed herein, the term "total number of single points of failure (SPoF) between affinity groups $AG_k$, $AG_m$" refers to the total number of network links and/or switches whose failure can result in the disconnection of the affinity ports $P(AG_k)$ from the affinity ports $P(AG_m)$. For example, with reference to FIG. 15, the total number of single points of failure between the nodes 1, 5 is equal to one link (e.g., the link coupling the nodes 1, 2) plus one switch (e.g., the node 2). Further, if the link coupling the nodes 1, 2 were part of a link-aggregation group, then the total number of single points of failure can be equal to one switch (e.g., the node 2).

It is noted that a "constrained" variant of the total number of single points of failure (SPoF) between affinity groups can be determined, taking into account the layer-2/layer-3 constraints (e.g., VLANs, spanning tree, etc.). Further, an "unconstrained" variant of the total number of single points of failure (SPoF) between affinity groups can be determined, taking into account the physical connectivity, but ignoring the layer-2/layer-3 constraints. Moreover, with regard to the total number of single points of failure (SPoF) between the exemplary affinity groups $AG_k$, $AG_m$, the headline value can correspond to the total number of single points of failure, and/or any other suitable headline value. In addition, the set of descriptive values can include a list of all affinity/network elements that make up the single points of failure, and/or any other suitable descriptive value. The total number of single points of failure descriptor can be specified in a temporal or conditional manner.

As employed herein, the term "total number of shared links and/or switches between affinity groups $AG_k$, $AG_m$" refers to the affinity/network elements (e.g., links, switches, routers) that are shared among communication paths used by the exemplary affinity group $AG_k$ (e.g., the communication paths between $P(AG_k^i)$ and $P(AG_k^j)$, where $AG_k^i$ and $AG_k^j$ are sub-components of $AG_k$), and the affinity/network elements (e.g., links, switches, routers) that are shared among communication paths used by the exemplary affinity group $AG_m$ (e.g., the communication paths between $P(AG_m^i)$ and $P(AG_m^j)$, where $AG_m^i$ and $AG_m^j$ are sub-components of $AG_m$).

Figure 16:
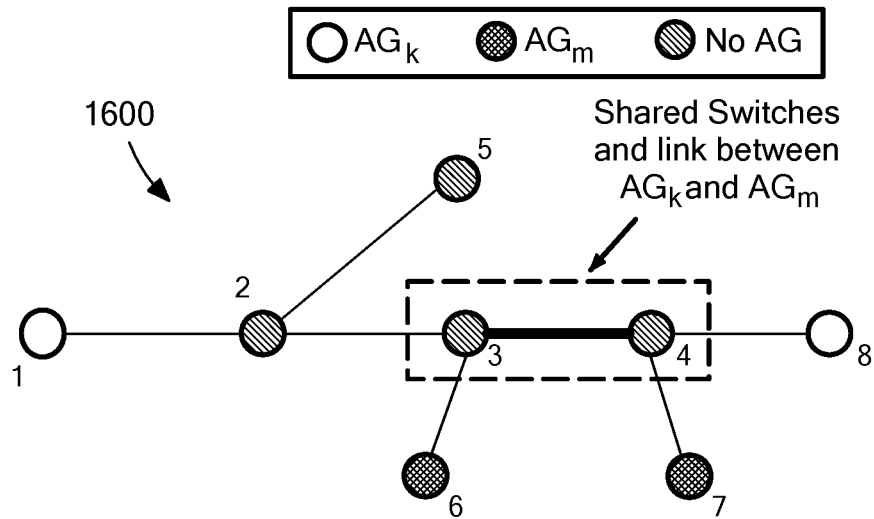
FIG. 16 is a block diagram of another exemplary affinity-network topology for use in determining the total number of shared links/switches between a plurality of affinity groups.

FIG. 16 depicts an exemplary affinity-network topology 1600, in which nodes 1, 8 correspond to sub-component affinity elements of the exemplary affinity group $AG_k$, nodes 6, 7 correspond to sub-component affinity elements of the exemplary affinity group $AG_m$, and nodes 2, 3, 4, 5 correspond to affinity elements that are not contained within any affinity group. With reference to FIG. 16, the nodes 3, 4, and the link coupling the nodes 3, 4, correspond to two switches and a single link that are shared between the affinity groups $AG_k$, $AG_m$.

It is noted that a "constrained" variant of the total number of shared links and/or switches between affinity groups can be determined, taking into account the layer-2/layer-3 constraints (e.g., VLANs, spanning tree, etc.). Further, an "unconstrained" variant of the total number of shared links and/or switches between affinity groups can be determined, taking into account the physical connectivity, but ignoring the layer-2/layer-3 constraints. Moreover, with regard to the total number of shared links and/or switches between the affinity groups $AG_k$, $AG_m$, the headline value can correspond to (1) the total number of shared links between the affinity groups $AG_k$, $AG_m$, (2) the total number of shared switches between the affinity groups $AG_k$, $AG_m$, and/or any other suitable headline value. In addition, the set of descriptive values can include (1) a list of shared links, (2) a list of shared switches, and/or any other suitable descriptive value. The total number of shared links and/or switches descriptor can be specified in a temporal or conditional manner.

As employed herein, the term "isolation of affinity group $AG_k$" refers to the network links and/or switches that are shared between the exemplary affinity group $AG_k$ and the rest of the network.

It is noted that a "constrained" variant of the isolation of an affinity group can be determined, taking into account the layer-2/layer-3 constraints (e.g., VLANs, spanning tree, etc.). Further, an "unconstrained" variant of the isolation of an affinity group can be determined, taking into account the physical connectivity, but ignoring the layer-2/layer-3 constraints. Moreover, with regard to the isolation of the affinity group $AG_k$, the headline value can correspond to an indication of whether or not the affinity group $AG_k$ is isolated, and/or any other suitable headline value. In addition, the set of descriptive values can include a list of shared links/switches that the affinity group $AG_k$ shares with the rest of the network, and/or any other suitable descriptive value. The isolation descriptor can be specified in a temporal or conditional manner.

As employed herein, the term "path intersection of affinity groups $AG_k$, $AG_m$" refers to the intersection between the communication paths used within the exemplary affinity group $AG_k$ and the affinity elements within the exemplary affinity group $AG_m$. For example, the affinity group $AG_m$ may describe a set of firewalls that communication paths between communicating affinity elements within the affinity group $AG_k$ must pass through.

Figure 17:
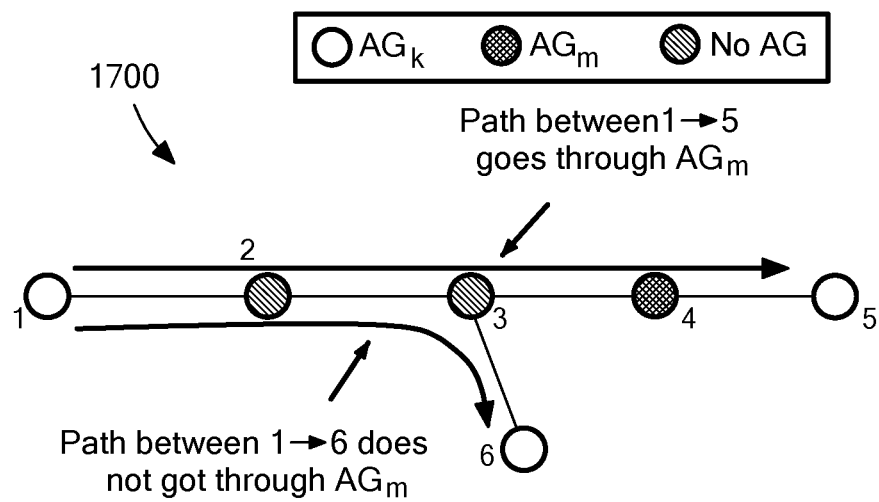
FIG. 17 is a block diagram of another exemplary affinity-network topology for use in determining the path intersection of a plurality of affinity groups.

FIG. 17 depicts an exemplary affinity-network topology 1700, in which nodes 1, 5, 6 correspond to sub-component affinity elements of the affinity group $AG_k$, node 4 corresponds to a sub-component affinity element of the affinity group $AG_m$, and nodes 2, 3, correspond to affinity elements that are not contained within any affinity group. With reference to FIG. 17, the path intersection of the affinity groups $AG_k$, $AG_m$ includes the communication path between the node 1 and the node 5 that goes through the affinity group $AG_m$. The communication path between the node 1 and the node 6 does not go through the affinity group $AG_m$.

It is noted that a "constrained" variant of the path intersection of affinity groups can be determined, taking into account the layer-2/layer-3 constraints (e.g., VLANs, spanning tree, etc.). Further, an "unconstrained" variant of the path intersection of affinity groups can be determined, taking into account the physical connectivity, but ignoring the layer-2/layer-3 constraints. Moreover, with regard to the path intersection of the affinity groups $AG_k$, $AG_m$, the headline value can correspond to an indication of whether or not each communication path within the affinity group $AG_k$ intersects at least one affinity element of the affinity group $AG_m$, and/or any other suitable headline value. In addition, the set of descriptive values can include a list of communicating affinity elements within the affinity group $AG_k$ that do not pass through any affinity element within the affinity group $AG_m$, and/or any other suitable descriptive value. The path intersection descriptor can be specified in a temporal or conditional manner.

Using at least the affinity-network topology, the affinity-network topology score calculator 210 (see FIG. 2) can determine an affinity link score for each of the affinity links. With regard to such affinity link scoring, the following assumptions can be made: (1) the affinity link scoring is a function of the sensitive/bounded affinity requirements specified by the user (e.g., affinity requirements characterized as being insensitive can be omitted); and, (2) if no user affinity requirements have been specified, then default templates can be employed for the communications, security, and reliability-related affinity requirements.

Affinity link scoring is described below with reference to the following illustrative example. In this example, "$R_1, \ldots, R_K$" denotes values for the sensitive/bounded affinity requirements, "$A_1, \ldots, A_K$" denotes computed values for the corresponding attributes of the affinity requirements, and "$f_i(R_i, A_i)$" denotes the affinity score for attribute i. The total affinity score for an affinity link can be denoted as, $G[f_1(R_1,A_1), f_2(R_2,A_2), \ldots, f_K(R_K,A_K)]$, which can distinguish between "independent attributes" (e.g., the hop count, the number of shared switches before disconnection, etc.) and dependent attributes (e.g., the hop count, the bounded hop count, the latency, the bandwidth, etc.).

Assuming that the total affinity score for an affinity link is linear and normalized with respect to $f_i \in [0,1]$, the affinity link scores can be added up, with appropriate weighting for the independent affinity requirements. Further, assuming all sensitive/bounded attributes are pair-wise independent, the total normalized affinity score for an affinity link can be expressed as follows, $$G[f_1(R_1, A_1), f_2(R_2, A_2), \cdots, f_K(R_K, A_K)] = \left(\frac{1}{K \cdot \sum_{i=1}^{K} \alpha_i}\right) \sum_{i=1}^{K} [\alpha_i \cdot f_i(R_i, A_i)], \quad (2)$$

in which "$\alpha_i$" denotes a weighting value associated with the attribute i. It is noted that this example can be extended to non-pair-wise independent sensitive/bounded attributes by grouping dependent attributes into joint attributes for such affinity link scoring purposes.

Using at least the affinity-network topology, the affinity-network topology score calculator 210 (see FIG. 2) can determine an affinity group score for each of the affinity groups. With regard to such affinity group scoring, the affinity group score can be a function of the scores of all of the affinity group's outgoing affinity links. For example, the total affinity group score, "p", can be expressed as follows, $$p = H_p[G_1(\ldots), G_2(\ldots), \ldots, G_D(\ldots)], \quad (3)$$

in which "D" denotes the total number of outgoing affinity links from the affinity group. Alternatively, the affinity group score can be a function of all of the individual attributes on all of the outgoing links. For example, in this case, the total affinity group score, "p", can be expressed as follows, $$p = G^*[\{f^1(\ldots)\}, \{f^2(\ldots)\}, \ldots, \{f^D(\ldots)\}], \quad (4)$$

in which "$\{f^L(\ldots)\}$" denotes the set of sensitive/bounded attribute scores on the affinity link L, and "$G^*[\ldots]$" is similar to "$G[\ldots]$" (see equation (2) above) but takes into account duplicate affinity requirements across multiple affinity links.

Using at least the affinity-network topology, the affinity-network topology score calculator 210 (see FIG. 2) can determine a network-wide affinity score, which can be a function of all of the affinity group scores. For example, such a network-wide affinity score can be expressed as follows, $$Q[H_1(\ldots), \ldots, H_M(\ldots)], \quad (5)$$

in which "H" denotes a respective affinity group score, and "M" denotes the total number of affinity groups.

It is noted that the network-wide affinity score, $Q[\ldots]$ (see equation (5) above), can distinguish between independent and dependent affinity groups. For example, two affinity groups can be regarded as being independent if they have no common affinity elements.

Illustrative methods of operating the system 200 (see FIG. 2) of functional components included in the affinity modeling component 102 (see FIG. 1) are described below with reference to FIG. 2 and FIGS. 18a-18g. As depicted in step 1801 (see FIG. 18a), a list of affinity elements and mapping to hardware elements is harvested, by the affinity element harvester 202 (see FIG. 2), from virtualization management tools (e.g., vCenter, etc.), user inputs, and/or other application management tools. As depicted in step 1802 (see FIG. 18a), network topology information is harvested, by the network topology harvester 204 (see FIG. 2), from network management tools (e.g., OpenNMS, Solarwinds, etc.), MIB tables from switches, user input, etc. As depicted in step 1803 (see FIG. 18a), the logical affinity topology (e.g., affinity groups interconnected by affinity links and their associated attributes/requirements) is calculated, by the affinity topology calculator 206 (see FIG. 2), from user-defined affinity descriptor modeling, and inferred affinity topology from application discovery management tools (e.g., EMC ADM, Insightix, etc.), virtualization management tools (e.g., vCenter, vCloud Director, vCatalog, etc.), application performance management tools (e.g., Solarwinds), and network statistic collection tools (e.g., sFlow collectors, netFlow collectors, etc.). As depicted in step 1804, the overall affinity-network topology is effectively stitched together, by the affinity-network topology calculator 208 (see FIG. 2), by overlaying the logical affinity topology upon the network topology. It is noted that re-harvesting of information can occur in response to a user trigger, a scheduled event, and/or a change notification for the affinity topology or network topology. As depicted in steps 1805 and 1806, the affinity-network topology is provided to the affinity-network topology viewer/score calculator, and the central controller, respectively.

Figure 18A:
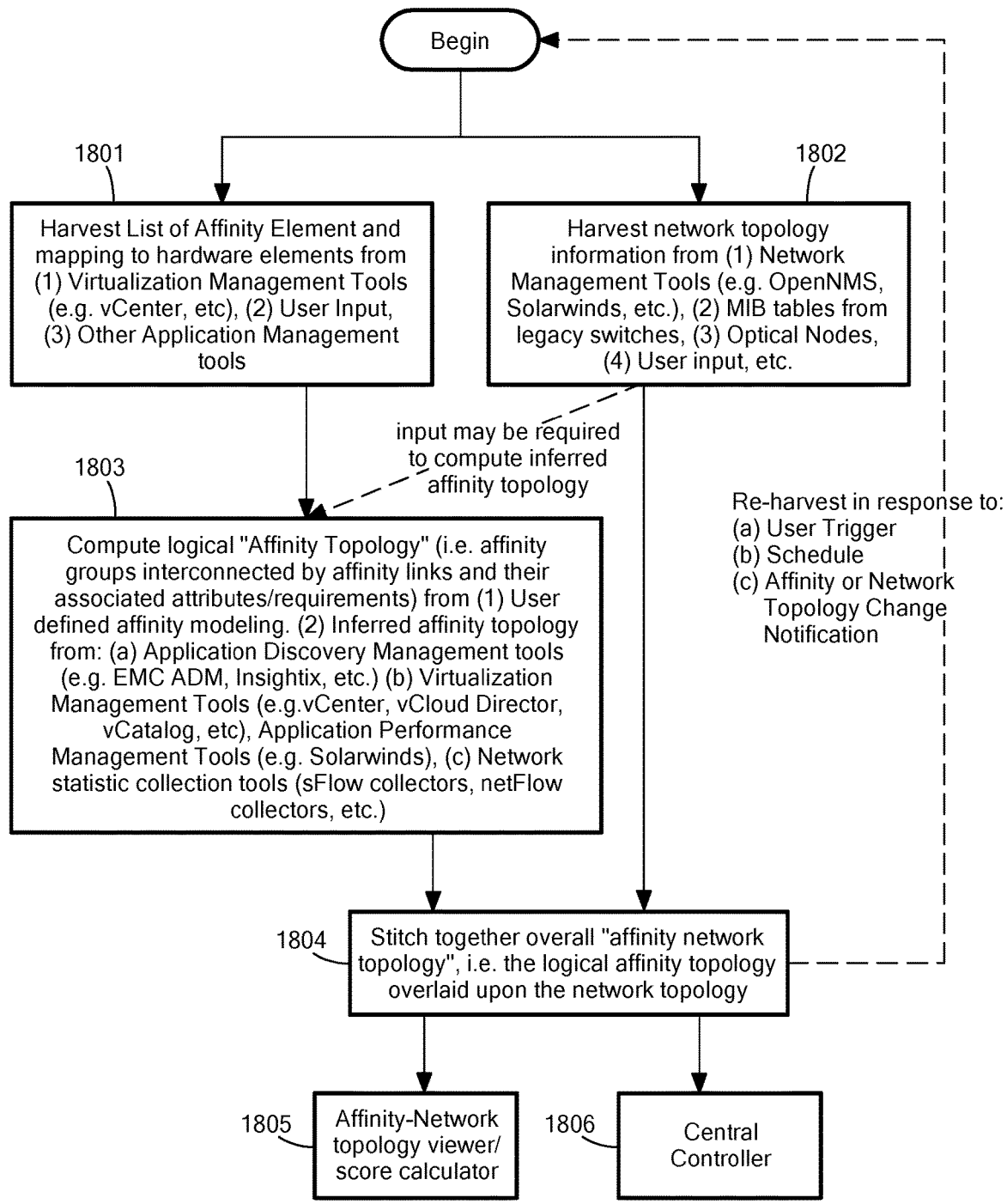
FIGS. 18a-18g are flow diagrams of exemplary methods of operating various functional components for modifying and/or implementing an affinity-network topology within the data center network architecture of FIG. 1.
Figure 18B:
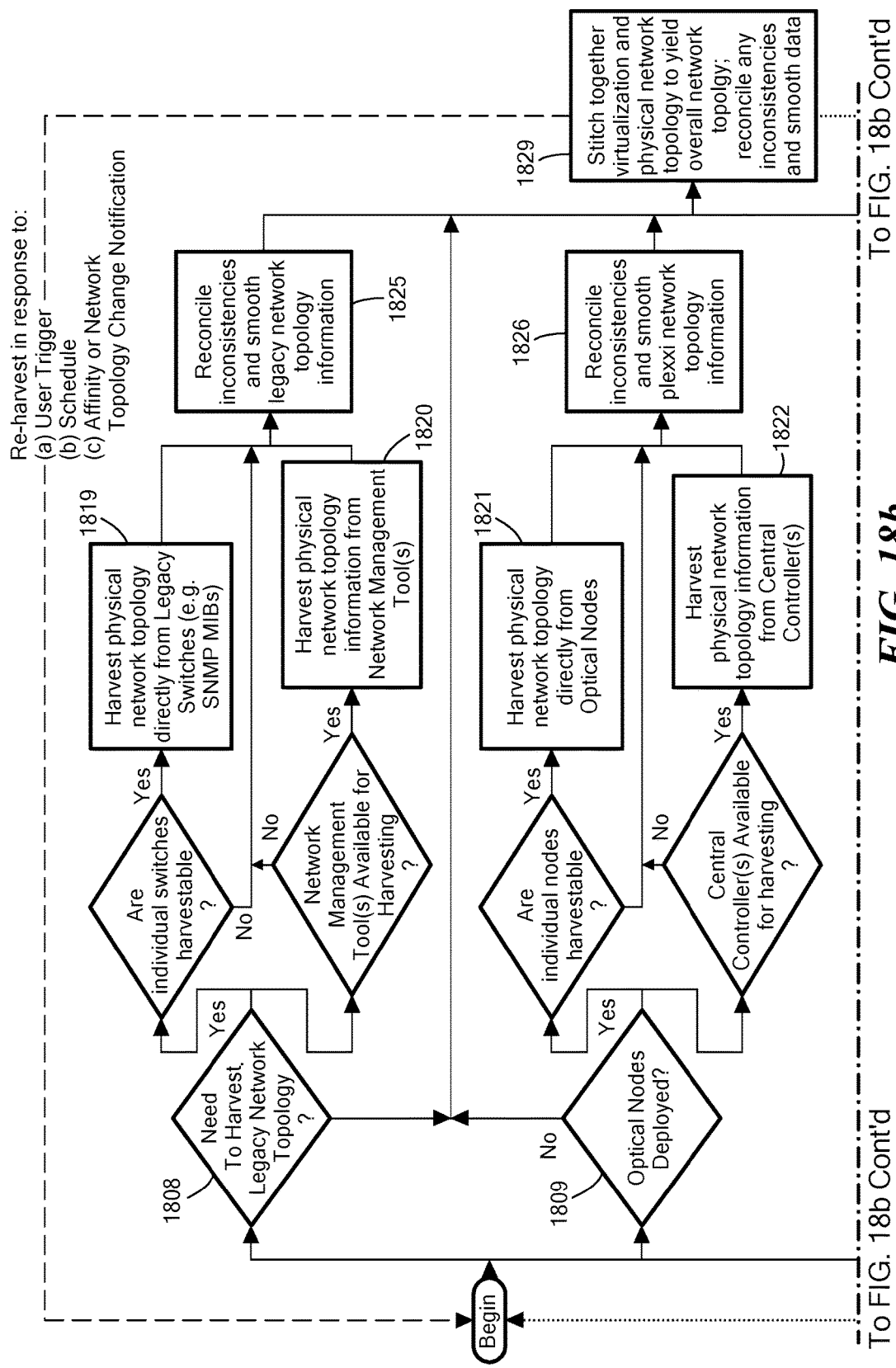
Figure 18B:
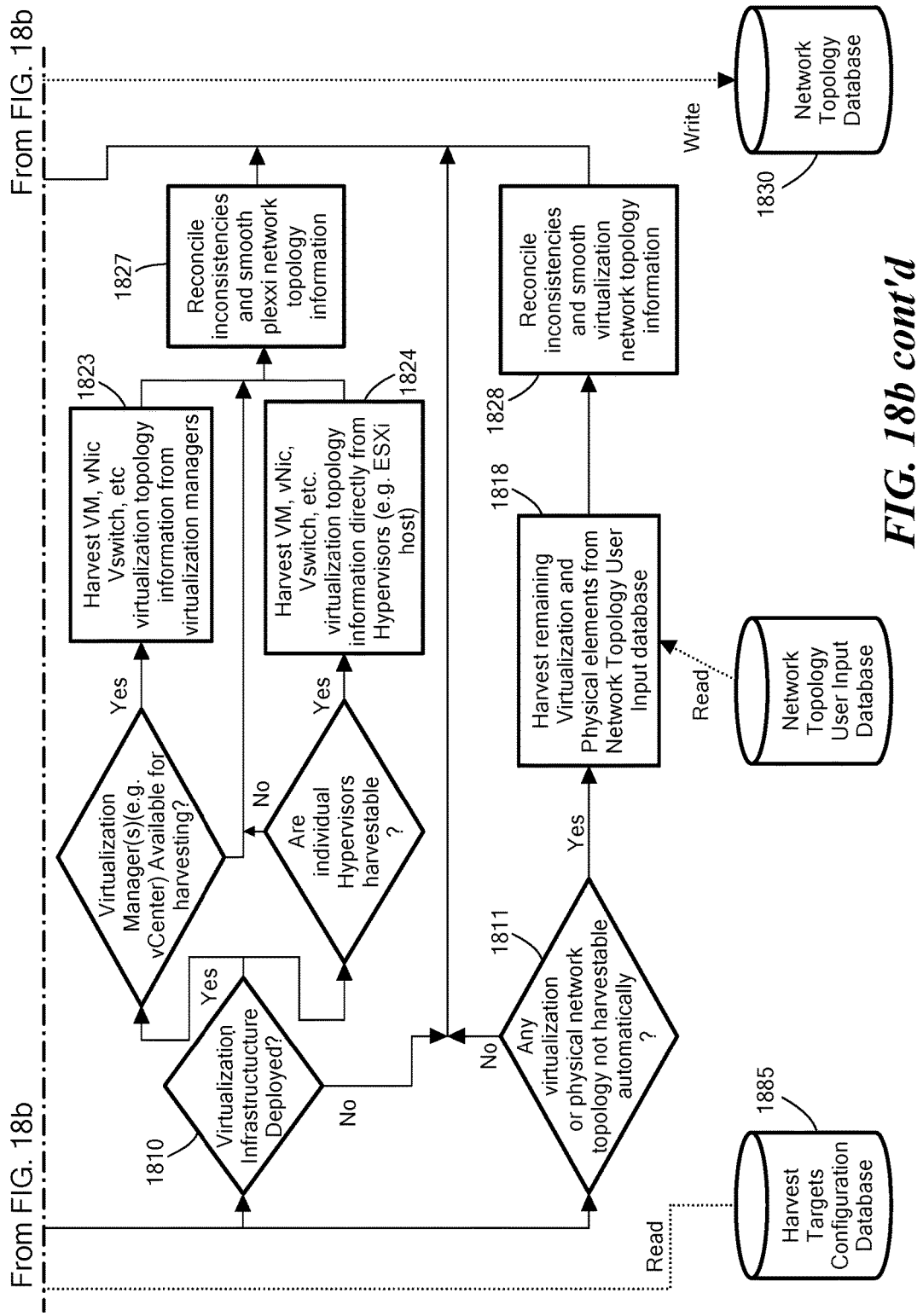

An illustrative method of operating the network topology harvester 204 (see FIG. 2) is described below with reference to FIG. 18b. As depicted in steps 1819, 1820, 1821, 1822 (see FIG. 18b), using information read from a harvest targets configuration database 1885, physical network topology information is harvested based at least on determinations as to whether there is a need to harvest legacy network topology (see step 1808, FIG. 18b), and/or whether there are any optical nodes containing optical switches deployed (see step 1809, FIG. 18b). Further, as depicted in steps 1823 and 1824 (see FIG. 18b), VM, vNIC, vSwitch, virtualization topology information, etc., is harvested based at least on a determination as to whether a virtualization infrastructure has been deployed (see step 1810, FIG. 18b). In addition, as depicted in step 1818 (see FIG. 18b), any remaining virtualization and physical network topology information is harvested based on a determination as to whether there are any such virtualization or physical network topology that are not harvestable automatically (see step 1811, FIG. 18b). As depicted in steps 1825, 1826, 1827, 1828 (see FIG. 18b), inconsistencies in the harvested information are reconciled, and the harvested network topology information is smoothed. As depicted in step 1829 (see FIG. 18b), the virtualization and physical network topology information is effectively stitched together to yield the overall network topology, reconciling any inconsistencies and smoothing data, as appropriate, and the network topology is written to a network topology database 1830 (see FIG. 18b). It is noted that re-harvesting of information can occur in response to a user trigger, a scheduled event, and/or a change notification for the affinity topology or network topology.

Figure 18C:
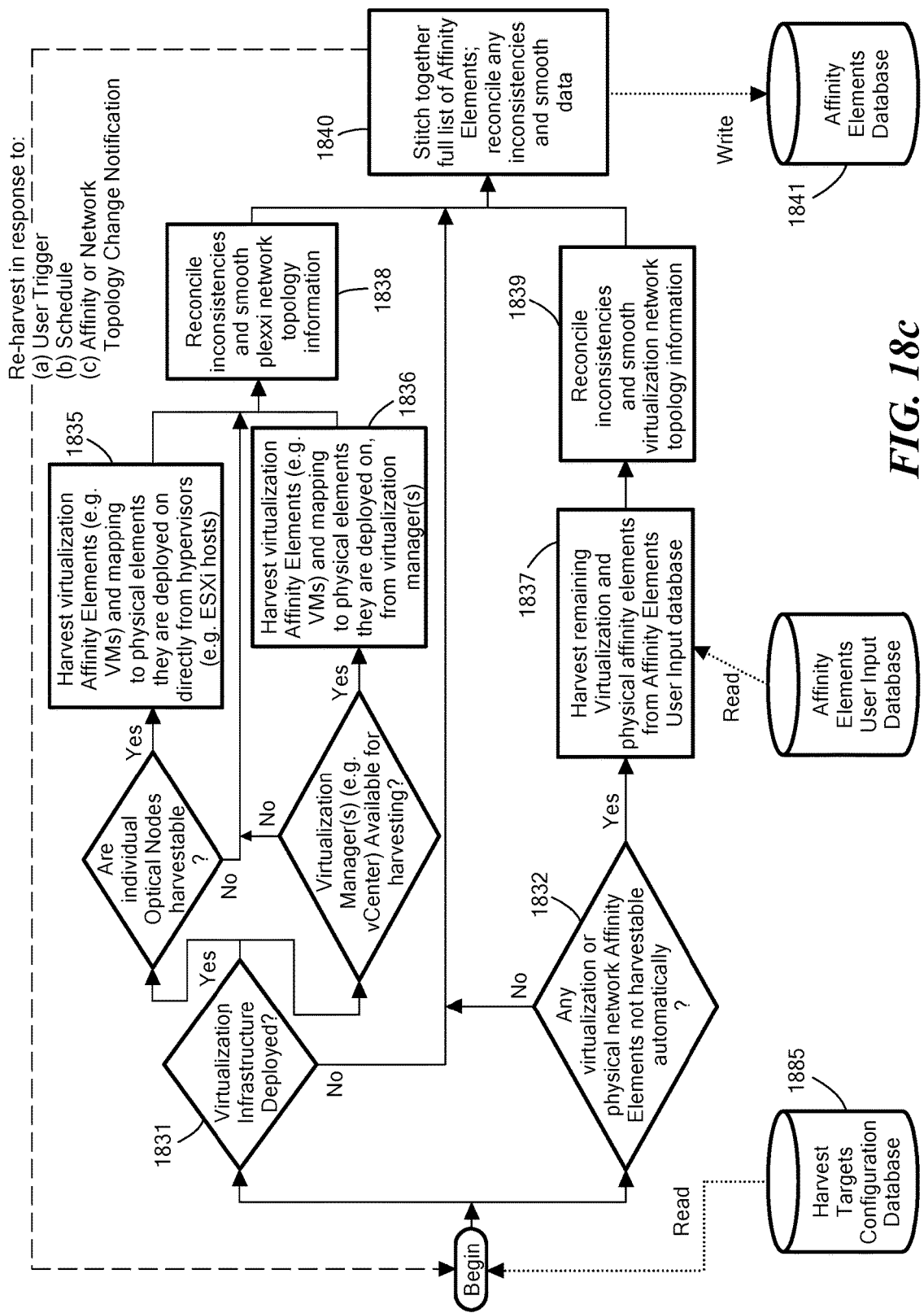

An illustrative method of operating the affinity element harvester 202 (see FIG. 2) is described below with reference to FIG. 18c. As depicted in steps 1835 and 1836 (see FIG. 18c), using information read from the harvest targets configuration database 1885, virtualization affinity elements (e.g., VMs), and the mapping to the physical elements they are deployed on, are harvested based at least on a determination as to whether a virtualization infrastructure has been deployed (see step 1831, FIG. 18c). As depicted in step 1837 (see FIG. 18c), any remaining virtualization and physical affinity elements are harvested based on a determination as to whether there are any virtualization or physical network affinity elements not harvestable automatically (see step 1832, FIG. 18c). As depicted in steps 1838 and 1839 (see FIG. 18c), inconsistencies in the harvested information are reconciled, and the harvested network topology information is smoothed. As depicted in step 1840 (see FIG. 18c), the full list of affinity elements are effectively stitched together, reconciling any inconsistencies and smoothing data, as appropriate, and the affinity elements are written to an affinity elements database 1841 (see FIG. 18c). It is noted that re-harvesting of information can occur in response to a user trigger, a scheduled event, and/or a change notification for the affinity topology or network topology.

Figure 18D:
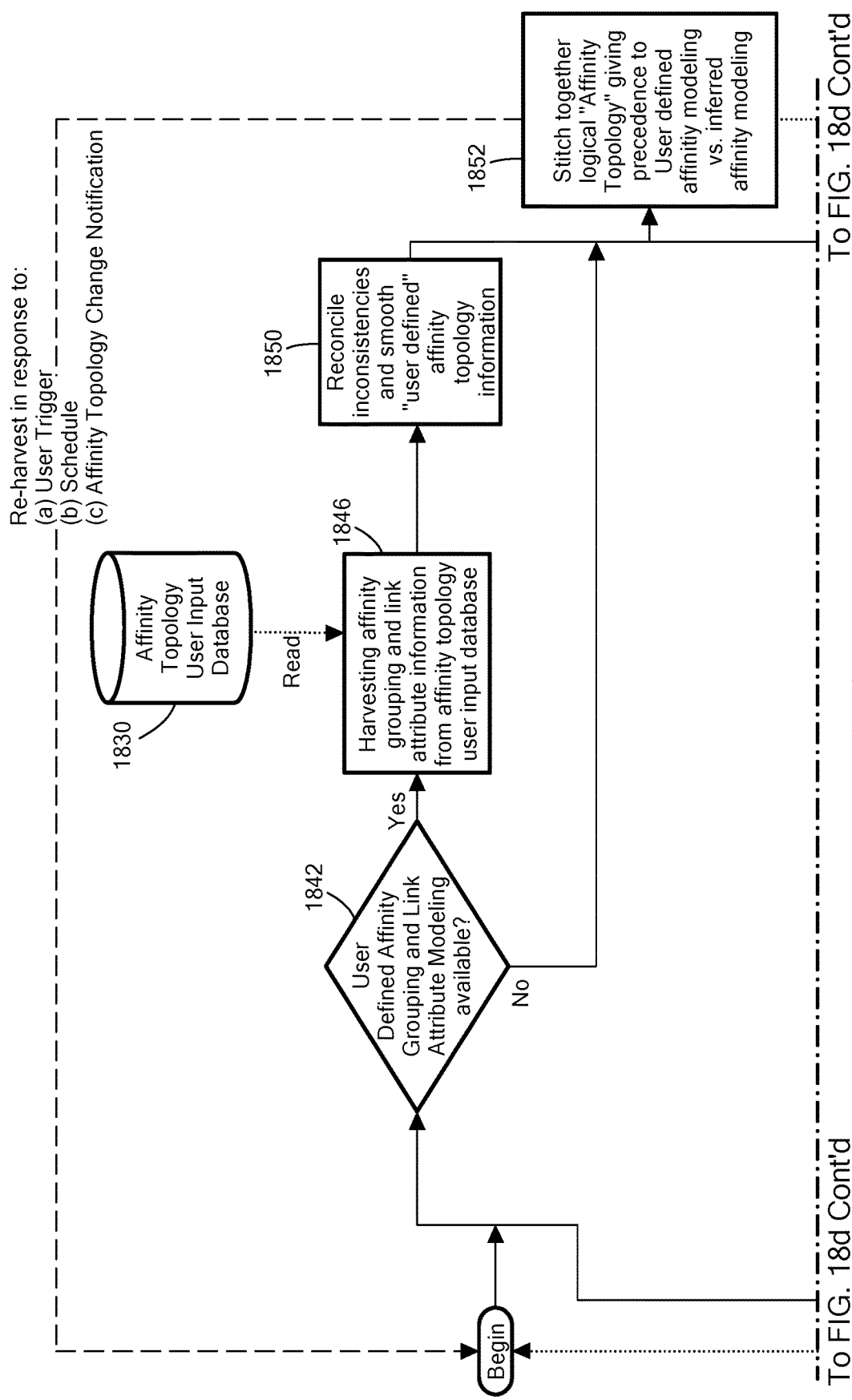
Figure 18D:
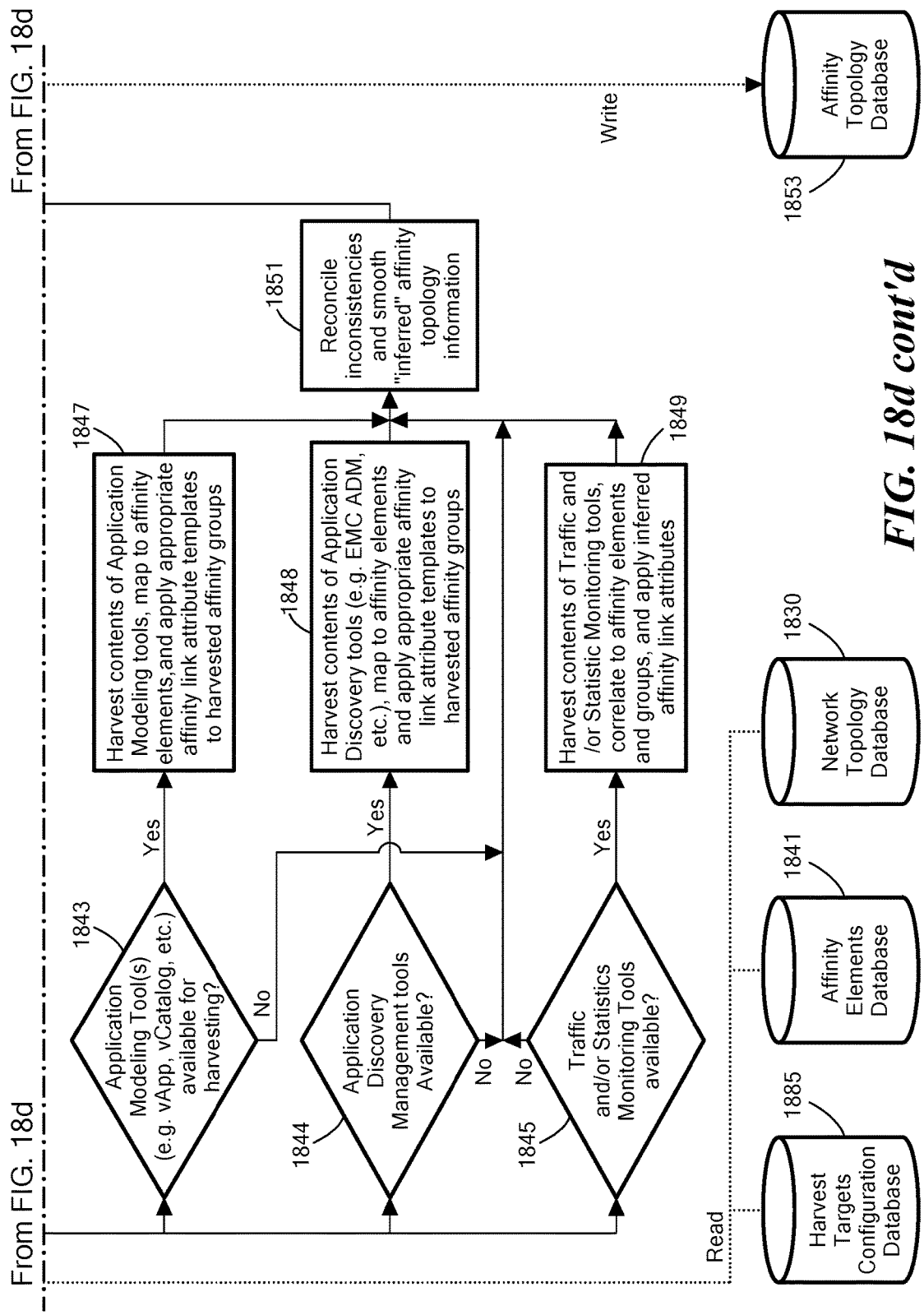

An illustrative method of operating the affinity topology calculator 206 (see FIG. 2), using information read from the harvest targets configuration database 1885, the affinity elements database 1841, and the network topology database 1830, is described below with reference to FIG. 18d. As depicted in step 1846 (see FIG. 18d), affinity grouping and link attribute information is harvested based on a determination as to whether there is user-defined affinity grouping and link attribute modeling available (see step 1842, FIG. 18d). As depicted in step 1847 (see FIG. 18d), contents of application modeling tools are harvested and mapped to affinity elements based on a determination as to whether there are application modeling tools available for harvesting (see step 1843, FIG. 18d). As depicted in step 1848 (see FIG. 18d), contents of application discovery tools are harvested and mapped to affinity elements based on a determination as to whether there are application discovery management tools available (see step 1844, FIG. 18d). As depicted in step 1849 (see FIG. 18d), contents of network traffic and/or statistic monitoring tools are harvested and correlated to affinity elements and affinity groups based on a determination as to whether there are network traffic and/or statistics monitoring tools available (see step 1845, FIG. 18d). As depicted in steps 1850 and 1851 (see FIG. 18d), inconsistencies in the harvested information are reconciled, and the harvested affinity topology information is smoothed. As depicted in step 1852 (see FIG. 18d), the logical affinity topology is effectively stitched together, giving precedence to user-defined affinity modeling versus inferred affinity modeling, and the affinity topology is written to an affinity topology database 1853 (see FIG. 18d). It is noted that re-harvesting of information can occur in response to a user trigger, a scheduled event, and/or a change notification for the affinity topology or network topology.

Figure 18E:
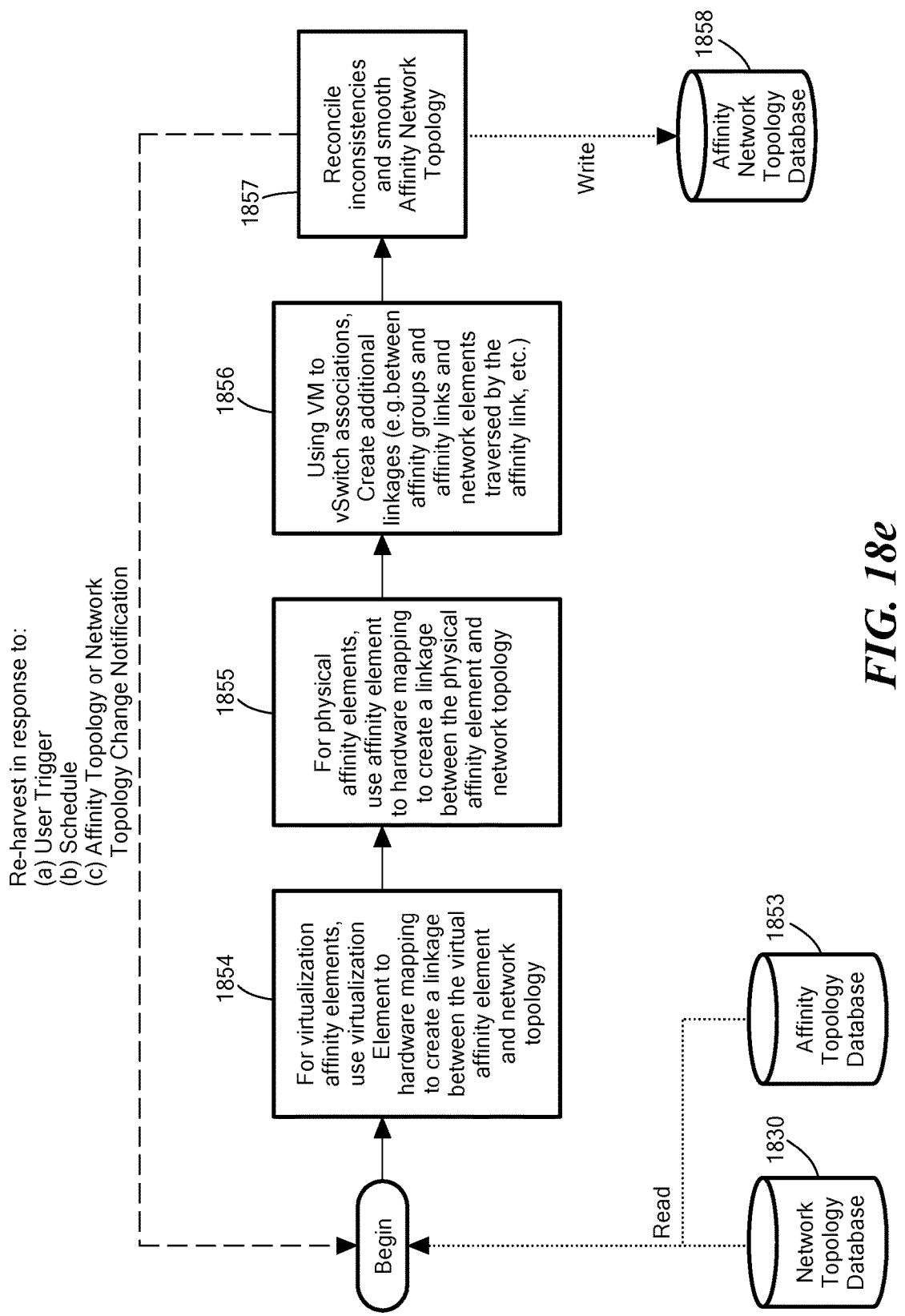

An illustrative method of operating the affinity-network topology calculator 208 (see FIG. 2) is described below with reference to FIG. 18e. As depicted in step 1854 (see FIG. 18e), using information read from the network topology database 1830 and the affinity topology database 1853, virtualization element-to-hardware mapping is employed, for virtualization affinity elements, to create a linkage between the virtual affinity element and network topology. As depicted in step 1855 (see FIG. 18e), for physical affinity elements, affinity element-to-hardware mapping is employed to create a linkage between the physical affinity element and network topology. As depicted in step 1856 (see FIG. 18e), using VM-to-vSwitch associations, additional linkages (e.g., between affinity groups and affinity links and network elements traversed by the affinity link, etc.) are created. As depicted in step 1857 (see FIG. 18e), inconsistencies in the linkages created in step 1856 (see FIG. 18e) are reconciled, the affinity-network topology information is smoothed, and the affinity-network topology is written to an affinity-network topology database 1858 (see FIG. 18e). It is noted that re-harvesting of information can occur in response to a user trigger, a scheduled event, and/or a change notification for the affinity topology or network topology.

Figure 18F:
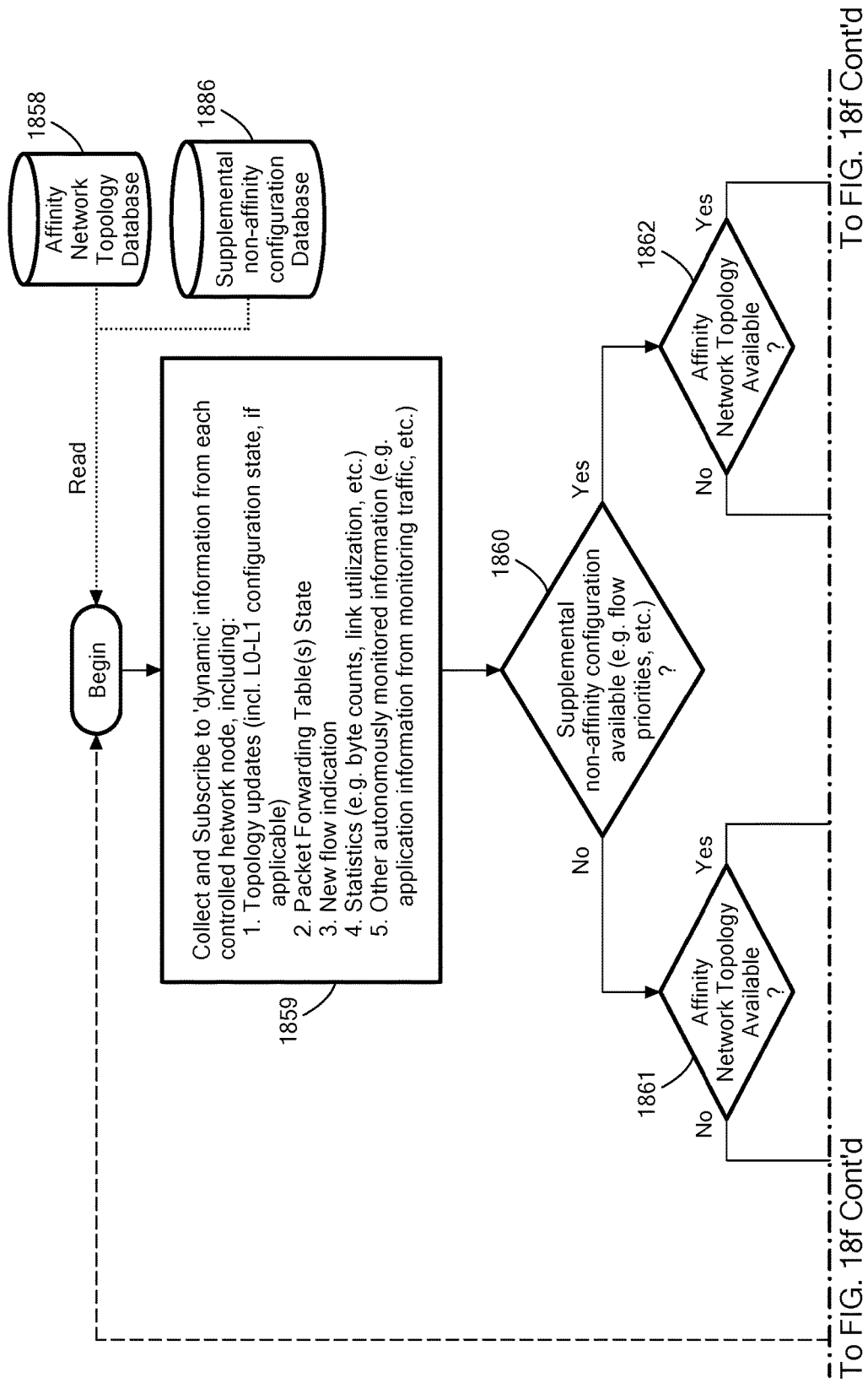
Figure 18F:
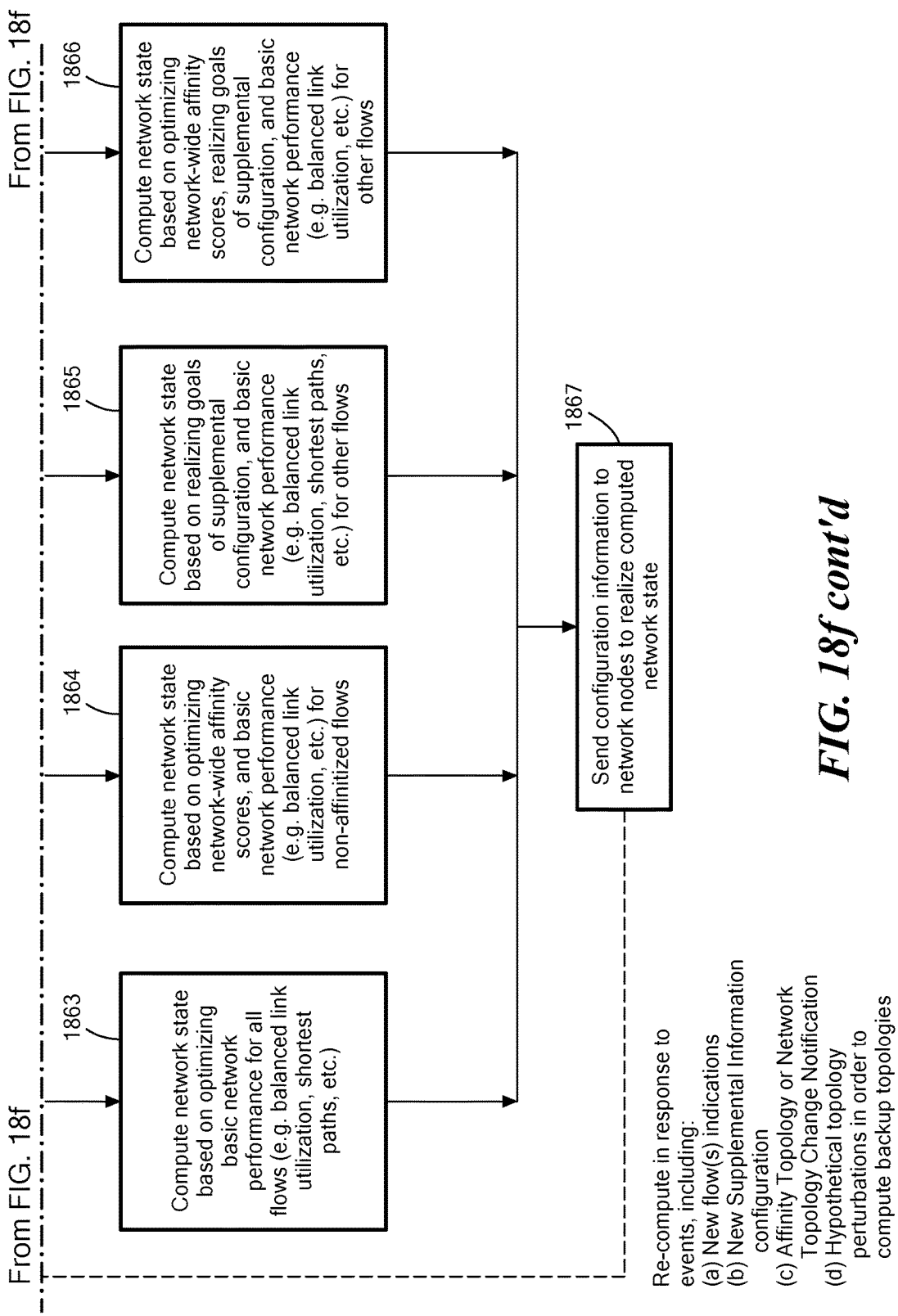

An illustrative method of operating the central controller 214 (see FIG. 2) is described below with reference to FIG. 18f. As depicted in step 1859 (see FIG. 18f), using information read from the affinity-network topology database 1858 and a supplemental non-affinity configuration database 1886, "dynamic" information is collected, and subscribed to, from each controlled network node, including topology updates (including layer-0/layer-1 configuration state, if applicable), packet forwarding table(s) state, new flow indication, statistics (e.g., byte counts, link utilization, etc.), and/or other autonomously monitored information (e.g., application information from monitoring network traffic, etc.). Based on whether a supplemental non-affinity configuration is available (e.g., flow priorities, etc.) (see step 1860, FIG. 18f), and whether an affinity-network topology is available (see steps 1861, 1862, FIG. 18f), one of the following steps is performed: (1) compute network state based on optimizing basic network performance for all flows (e.g., balanced link utilization, shortest paths, etc.) (see step 1863, FIG. 18f); (2) compute network state based on optimizing network-wide affinity scores, and basic network performance (e.g., balanced link utilization, etc.) for non-affinitized flows (see step 1864, FIG. 18f); (3) compute network state based on realizing goals of supplemental configuration, and basic network performance (e.g., balanced link utilization, shortest paths, etc.) for other flows (see step 1865, FIG. 18f); and (4) compute network state based on optimizing network-wide affinity scores, realizing goals of supplemental configuration, and basic network performance (e.g., balanced link utilization, etc.) for other flows (see step 1866, FIG. 18f). As depicted in step 1867 (see FIG. 18f), configuration information is sent to network nodes to realize computed network state. It is noted that, in response to one or more predetermined events, the following information can be re-computed: (1) new flow(s) indications, (2) new supplemental information configuration, (3) affinity topology or network topology change notification, and (4) hypothetical topology perturbations in order to compute backup topologies.

Figure 18G:
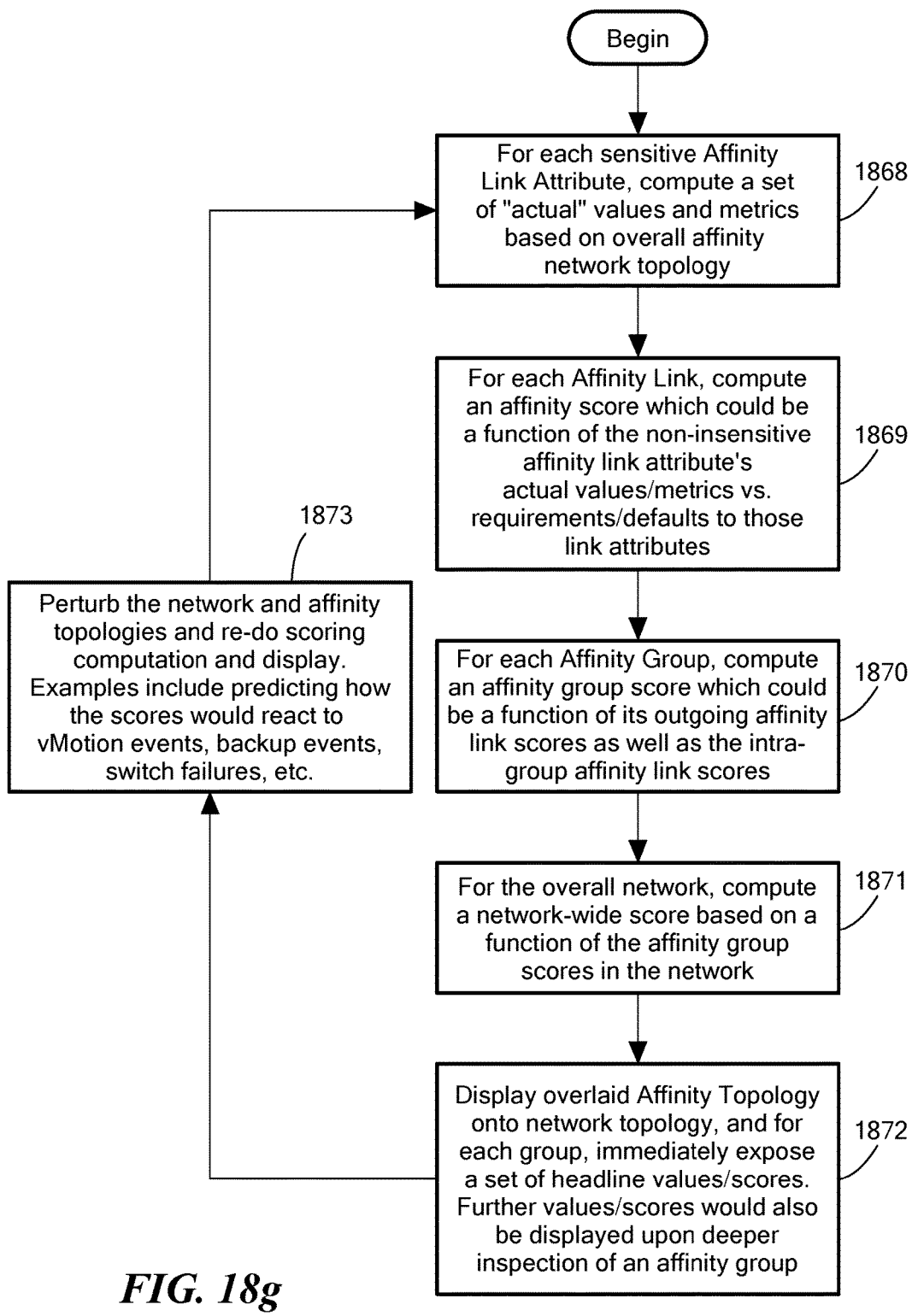

An illustrative method of operating the affinity-network topology score calculator 210 (see FIG. 2), and the affinity-network topology viewer 212 (see FIG. 2), is described below with reference to FIG. 18g. As depicted in step 1868 (see FIG. 18g), for each sensitive affinity link attribute, a set of "actual" values and metrics is computed based on the overall affinity-network topology. As depicted in step 1869 (see FIG. 18g), for each affinity link, an affinity link score is computed, by the affinity-network topology score calculator 210 (see FIG. 2), in which the affinity link score can be a function of the non-insensitive affinity link attributes' actual values/metrics versus the requirements/defaults for those link attributes. As depicted in step 1870 (see FIG. 18g), for each affinity group, an affinity group score is computed, by the affinity-network topology score calculator 210 (see FIG. 2), in which the affinity group score can be a function of its outgoing affinity link scores, as well as the intra-group affinity link scores. As depicted in step 1871 (see FIG. 18g), for the overall network, a network-wide score is computed, by the affinity-network topology score calculator 210 (see FIG. 2), based on a function of the affinity group scores in the network. As depicted in step 1872 (see FIG. 18g), the affinity topology overlaid onto the network topology is displayed, by the affinity-network topology viewer 212 (see FIG. 2), and, for each group, a set of headline values/scores is also displayed. It is noted that the affinity-network topology viewer 212 (see FIG. 2) can display further values/scores upon deeper inspection of an affinity group. As depicted in step 1873 (see FIG. 18g), the network and affinity topologies can be perturbed, and the scoring computation and display can be re-performed, for predicting how such scores can react to, e.g., vMotion events, backup events, switch failures, etc.

It is noted that the operations depicted and/or described herein are purely exemplary. Further, the operations can be used in any sequence, as appropriate, and/or can be partially used. With the above illustrative embodiments in mind, it should be understood that such illustrative embodiments can employ various computer-implemented operations involving data transferred or stored in computer systems. Such operations are those requiring physical manipulation of physical quantities. Typically, though not necessarily, such quantities can take the form of electrical, magnetic, and/or optical signals capable of being stored, transferred, combined, compared, and/or otherwise manipulated.

Further, any of the operations depicted and/or described herein that form part of the illustrative embodiments are useful machine operations. The illustrative embodiments can also relate to a device or an apparatus for performing such operations. The apparatus can be specially constructed for the required purpose, or can be a general-purpose computer selectively activated or configured by a computer program stored in the computer to perform the function of a particular machine. In particular, various general-purpose machines employing one or more processors coupled to one or more computer readable media can be used with computer programs written in accordance with the teachings disclosed herein, or it may be more convenient to construct a more specialized apparatus to perform the required operations.

Instructions for implementing the network architectures disclosed herein can also be embodied as computer readable code on a computer readable medium. The computer readable medium is any data storage device that can store data, which can thereafter be read by a computer system. Examples of such computer readable media include magnetic and solid state hard drives, read-only memory (ROM), random-access memory (RAM), Blu-ray™ disks, DVDs, CD-ROMs, CD-Rs, CD-RWs, magnetic tapes, and/or any other suitable optical or non-optical data storage device. The computer readable code can be stored in a single location, or stored in a distributed manner in a networked environment.

The foregoing description has been directed to particular illustrative embodiments of this disclosure. It will be apparent, however, that other variations and modifications may be made to the described embodiments, with the attainment of some or all of their associated advantages. Moreover, the procedures, processes, components, and/or modules described herein may be implemented in hardware, software, embodied as a computer-readable medium having program instructions, firmware, or a combination thereof. For example, the functions described herein may be performed by at least one processor executing program instructions out of at least one memory or other storage device.

It will be appreciated by those skilled in the art that modifications to and variations of the above-described systems and methods may be made without departing from the inventive concepts disclosed herein. Accordingly, the disclosure should not be viewed as limited except as by the scope and spirit of the appended claims.

What is claimed is:

1. A method for configuring a computer network having a plurality of network elements, the network elements including a plurality of nodes interconnected by network links, the method comprising:

obtaining a network topology specifying a topology of the network elements and interconnections of the network elements by the network links;

obtaining an affinity topology including a multicast dispersion descriptor requirement specifying a maximum acceptable difference in arrival times of a multicast message transmitted by a first affinity element at at least two destination affinity elements;

computing an affinity-network topology that represents a logical combination of the network topology and the affinity topology that satisfies the multicast dispersion descriptor requirement; and configuring the plurality of nodes in accordance with the computed affinity-network topology so that the multicast message transmitted by the first affinity element is received by the at least two destination affinity elements in satisfaction of the multicast dispersion descriptor requirement.

2. The method of claim 1 wherein the step of configuring the plurality of nodes comprises the step of configuring optical receivers, optical transmitters and switches within the plurality of nodes.

3. The method of claim 1 further including the step of transmitting the multicast message from the first affinity element to the at least two destination affinity elements for receipt by the at least two destination affinity elements in satisfaction of the multicast dispersion descriptor requirement.

4. The method of claim 2 wherein each one of the plurality of nodes is an optical node.

5. The method of claim 1 wherein the step of obtaining the affinity topology further includes the step of obtaining a latency descriptor requirement specifying a maximum time before the multicast message is received at each of the at least two destination affinity elements, and wherein the step of configuring comprises the step of configuring the plurality of nodes in accordance with the computed affinity-network topology so that the multicast message transmitted by the first affinity element is received by the at least two destination affinity elements in satisfaction of the multicast dispersion descriptor requirement and the latency descriptor requirement.

6. The method of claim 5 further including the step of transmitting the multicast message from the first affinity element to the at least two destination affinity elements for receipt by the at least two destination affinity elements in satisfaction of both the multicast dispersion descriptor requirement and the latency descriptor requirement.

7. The method of claim 6 wherein each one of the plurality of nodes is an optical node.

8. The method of claim 1 wherein each affinity element corresponds to an application component.

9. The method of claim 1 wherein the first affinity element and the at least two destination affinity elements are in a single affinity group that represents a grouping of affinity elements.

10. A method for configuring a computer network having a plurality of network elements, the network elements including a plurality of nodes interconnected by network links, the method comprising:

obtaining a network topology specifying a topology of the network elements and interconnections by the network elements;

obtaining an affinity topology including a multicast dispersion descriptor requirement specifying a maximum acceptable difference in hop counts for a multicast message transmitted by a first affinity element to at least two destination affinity elements;

computing an affinity-network topology that represents a logical combination of the network topology and the affinity topology that satisfies the multicast dispersion descriptor requirement; and configuring the plurality of nodes in accordance with the computed affinity-network topology so that the multicast message transmitted by the first affinity element is received by the at least two destination affinity elements in satisfaction of the multicast dispersion descriptor requirement.

11. The method of claim 10 wherein the step of configuring the plurality of nodes comprises the step of configuring optical receivers, optical transmitters and switches within the plurality of nodes.

12. The method of claim 10 further including the step of transmitting the multicast message from the first affinity element to the at least two destination affinity elements for receipt by the at least two destination affinity elements in satisfaction of the multicast dispersion descriptor requirement.

13. The method of claim 12 wherein each one of the plurality of nodes is an optical node.

14. The method of claim 10 wherein the step of obtaining the affinity topology further includes the step of obtaining a maximum hop count descriptor requirement specifying a maximum number of hops for receipt of the multicast message transmitted by the first affinity element at each of the at least two destination affinity elements, and wherein the configuring step comprises the step of configuring the plurality of nodes in accordance with the computed affinity-network topology so that a multicast message transmitted by the first affinity element is received by the at least two destination affinity elements in satisfaction of the multicast dispersion descriptor requirement and the maximum hop count descriptor requirement.

15. The method of claim 14 further including the step of transmitting the multicast message from the first affinity element to the at least two destination affinity elements for receipt by the at least two destination affinity elements in satisfaction of both the multicast dispersion descriptor requirement and the maximum hop count descriptor requirement.

16. The method of claim 15 wherein each one of the plurality of nodes is an optical node.

17. The method of claim 10 wherein each affinity element corresponds to an application component.

18. The method of claim 10 wherein the first affinity element and the at least two destination affinity elements are in a single affinity group that represents a grouping of affinity elements.

* * * * *